United States Patent [19]

Henderson et al.

[11] 4,357,489
[45] Nov. 2, 1982

[54] LOW VOLTAGE SPEECH SYNTHESIS SYSTEM WITH PULSE WIDTH DIGITAL-TO-ANALOG CONVERTER

[75] Inventors: Alva E. Henderson; Gene A. Frantz, both of Lubbock, Tex.

[73] Assignee: Texas Instruments Incorporated, Dallas, Tex.

[21] Appl. No.: 118,138

[22] Filed: Feb. 4, 1980

[51] Int. Cl.³ .............................................. G10L 1/00
[52] U.S. Cl. ................................................. 179/1 SM
[58] Field of Search .......................... 179/1 SM, 1 SA; 340/347 M; 84/1.01; 332/1; 328/13

[56] References Cited

U.S. PATENT DOCUMENTS

| | | | |
|---|---|---|---|
| 3,577,084 | 5/1971 | Atcherson | 340/347 M |
| 3,754,233 | 8/1973 | Sutherland | 340/347 M |
| 3,789,393 | 1/1974 | Tripp | 340/347 M |
| 3,928,722 | 12/1975 | Nakata et al. | 179/1 SM |
| 4,022,974 | 5/1977 | Kohut et al. | 179/1 SM |
| 4,052,563 | 10/1977 | Noda et al. | 179/1 SA |
| 4,209,781 | 6/1980 | Puri et al. | 340/347 DA |

OTHER PUBLICATIONS

Mozer, "Talking Board", Computer Design, Jul. 1976, pp. 46, 48.
Glaser et al., "Integrated Circuit Engineering", Addison-Wesley, May, 1979, pp. 9 and 280-284.
Hnatek, E., "A User's Handbook of D/A and A/D Converters", Wiley, 1976, pp. 246, 247.
Smith, S., "Single-Chip Speech Synthesizers", Computer Design, Nov., 1978, pp. 188, 190, 192.

Primary Examiner—Mark E. Nusbaum
Assistant Examiner—E. S. Kemeny
Attorney, Agent, or Firm—William E. Hiller; Melvin Sharp; James T. Comfort

[57] ABSTRACT

Integrated circuit speech synthesis system utilizing complementary metal-insulator-semiconductor technology to achieve low voltage operation, wherein a pluse width modulated digital-to-analog converter is employed to provide for accurate conversion of digital signals into analog signals even though the low voltage operation prohibits the large voltage swings normally required for digital-to-analog converter circuitry. The speech synthesis system includes a linear predictive filter as a speech synthesizer which utilizes coded reflection coefficients to produce digital signals representative of human speech. A microprocessor controls the access of digitized speech data which is stored in a memory. The speech synthesizer and microprocessor along with the pulse width modulated digital-to-analog converter are implemented in complementary metal-insulator-semiconductor technology. The system also includes a speaker for generating audible sounds in the form of synthesized human speech from the analog signals provided by the digital-to-analog converter.

2 Claims, 36 Drawing Figures

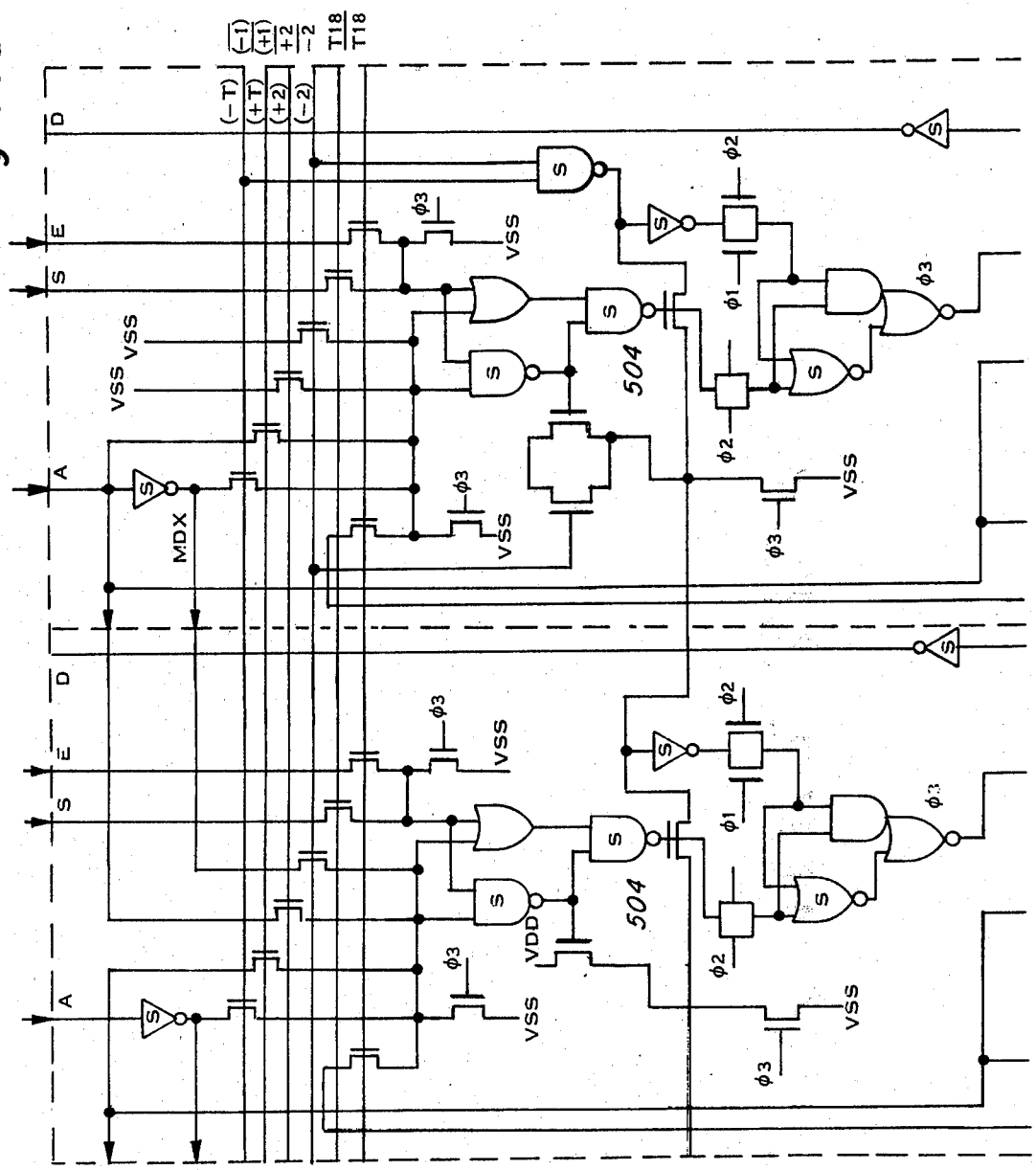

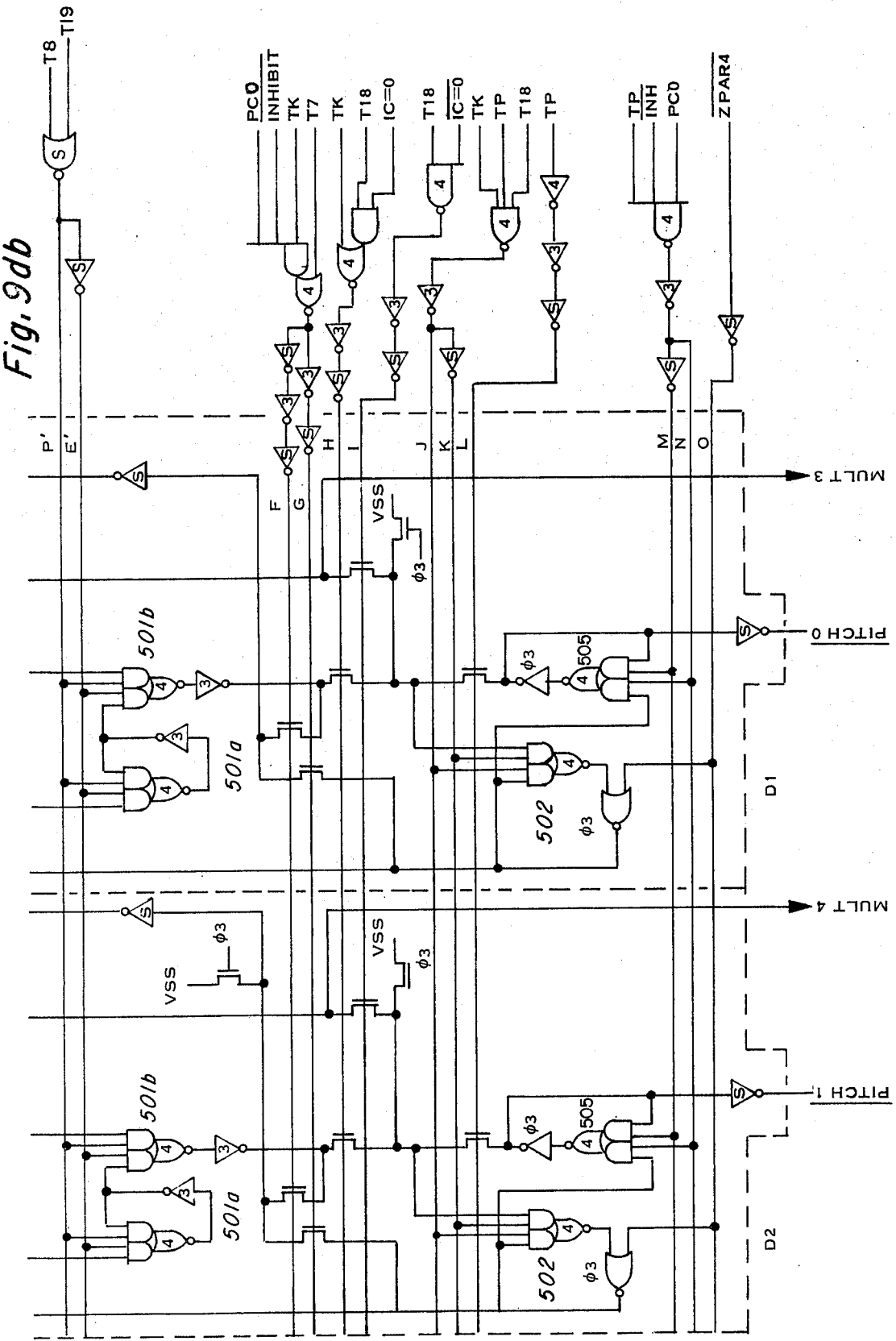

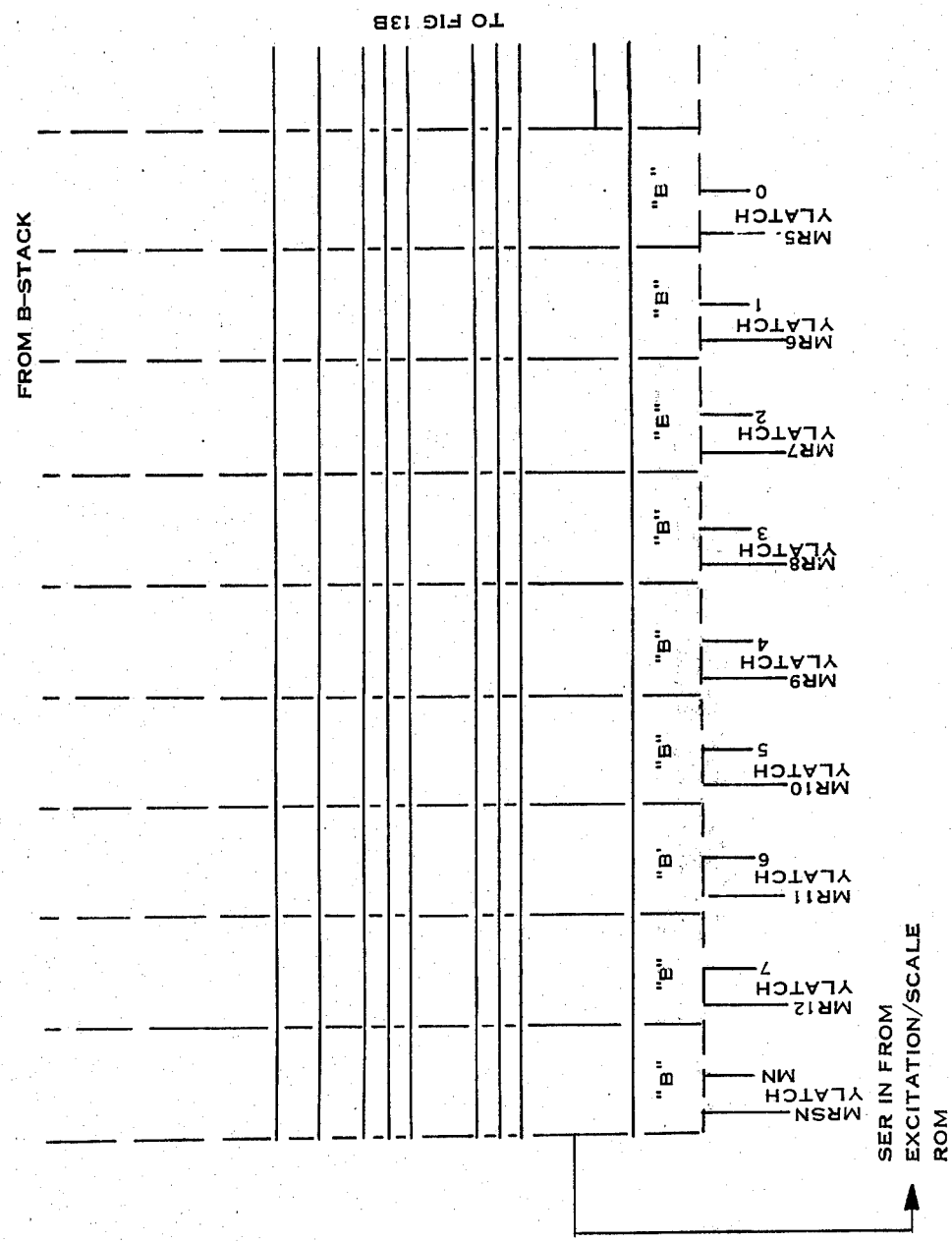

LOW VOLTAGE SPEECH SYNTHESIS SYSTEM WITH PULSE WIDTH DIGITAL-TO-ANALOG CONVERTER

BACKGROUND OF THE INVENTION

This invention relates to a speech synthesis system having circuit components capable of being implemented as an integrated circuit device utilizing complementary metal-insulator-semiconductor technology to enable the system to operate at a relatively low voltage. More specifically, this invention relates to a low voltage digital speech synthesis system with circuit components implemented in a complementary metal-insulator-semiconductor integrated circuit device in which the digital-to-analog converter is of a pulse width modulated type offering accurate conversion of digital speech signals into analog signals from which synthesized human speech may be generated even though the low voltage operation restricts the extent of the voltage swings normally required in converting digital signals to analog signals.

Several techniques are known in the prior art for digitizing human speech. For example, pulse code modulation, differential pulse code modulation, adaptive predictive coding, delta modulation, channel vocoders, cepstrum vocoders, formant vocoders, voice excited vocoders, and linear predictive coding techniques of speech digitization are known. The techniques are briefly explained in "Voice Signals; Bit by Bit" on pages 28–34 of the October, 1973 issue of IEEE Spectrum.

In certain applications and particularly those in which digitized speech is to be stored in a memory, most researchers tend to use the linear predictive coding technique because it produces a very high quality speech using rather low data rates. An excellent example of the use of linear predictive coding systems, implementable in integrated circuit techniques may be seen in U.S. Patent Application Ser. No. 901,393, filed Apr. 28, 1978, now U.S. Pat. No. 4,209,836 issued June 24, 1980. The speech synthesis system described in the aforementioned U.S. Pat. No. 4,209,836 utilizes frames of data which are comprised of digital representations of pitch, energy and certain linear predictive coefficients for controlling a digital filter. The system described in the aforementioned U.S. Pat. No. 4,209,836 is capable of producing high quality synthetic human speech at a bit rate of as low as 1200 bits per second, utilizing a fixed rate of data frame entry. As integrated speech synthesis systems continue to develop a need arises for low voltage applications. Such low voltage applications which are known in the art wherein a small battery source may provide the electrical supply, have two inherent problems. Firstly, in an embodiment such as an electronic learning aid, translator, or calculator, the current source required for such a system will result in short battery life. Secondly, a low voltage speech synthesis system will have difficulty in accurately simulating the human speech waveform while constrained to a low voltage swing. Standard digital-to-analog converter devices utilized in integrated circuit speech synthesis systems, such as the circuit described in U.S. Pat. No. 4,209,836, lack sufficient accuracy and resolution to be utilized in low voltage applications such as complementary metal-insulator-semiconductor technology. An ideal solution to the aforementioned problem, would require a speech synthesis system capable of synthesizing human speech from frames of data at sufficiently low voltage levels to reduce the current drain which shortens battery life, and a digital-to-analog converter capable of producing accurate representations of complex waveforms at low voltage levels.

It is therefore one object of this invention to improve speech synthesis technology.

It is another object of this invention to provide a speech synthesis system capable of accurately synthesizing human speech at low voltage levels.

It is still another object of this invention to provide a speech synthesis system with a digital-to-analog converter capable of accurately modelling complex waveforms at low voltage levels.

The foregoing objects are achieved as now described. A low voltage speech synthesis system with a linear predictive filter is provided. The linear predictive filter utilizes reflection coefficients to produce digital signals representative of human speech. An integrated circuit controller controls the access of digitized speech data stored in a memory circuit. Synthesis and control circuits are implemented in complementary metal-insulator-semiconductor technology to provide low voltage operation. A pulse width modulated digital-to-analog converter also implemented in complementary metal-insulator-semiconductor technology permits accurate conversion of digital signals into analog signals in low voltage operation.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 6 is a detailed logic diagram of the instruction decoder circuitry.

FIGS. 6b and 6c are detailed logic diagrams of buffers for the I/O pads of the instruction decoder shown in FIG. 6a.

FIGS. 13a and 13b are detailed logic diagrams of a multiplexer and an excitation/scale register employed in the speech synthesis system.

GENERAL DESCRIPTION OF THE INVENTION

Figure 1A:
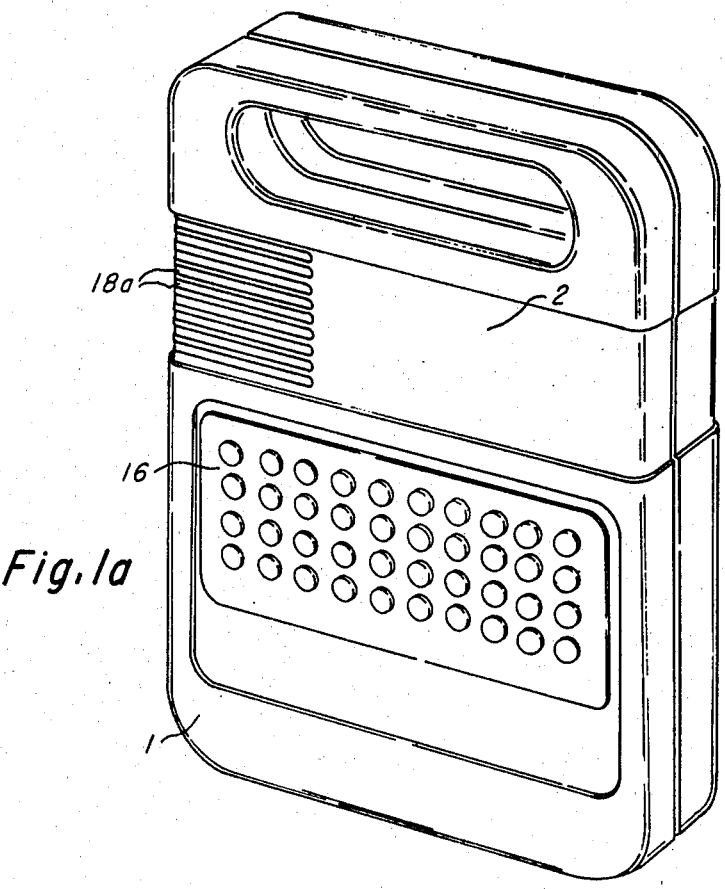
FIG. 1a is a view of an electronic learning aid which is a suitable structure for enclosing the speech synthesizer system.
Figure 1B:
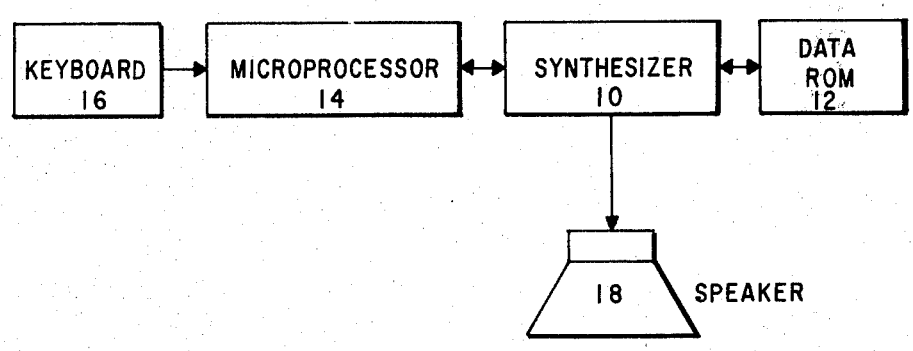
FIG. 1b is a generalized block diagram of a speech synthesis system.

Referring to FIG. 1a, there is shown an electronic learning aid which may serve as a suitable structure for enclosing the speech synthesis system of the present invention. FIG. 1b shows a generalized block diagram of the major components which make up such a learning aid. Keyboard 16 may be a standard matrix keyboard such as the type disclosed in U.S. Pat. No. 4,074,055. Various algorithms required to implement the desired modes of operation of an electronic learning aid, electronic language translator or other applications may be programmed into the microprocessor in a manner well known in the art. An example of one such algorithm may be seen in the aforementioned U.S. Pat. No. 4,209,836.

Data ROM 12 is a standard non-volatile Read Only Memory such as is described in the aforementioned U.S. Pat. No. 4,209,836. The coded or uncoded filter parameters which are utilized to control synthesizer 10 are stored therein. Synthesizer 10 is a linear predictive filter type synthesizer such as is described in U.S. patent application Ser. No. 905,328 filed May 12, 1978, now U.S. Pat. No. 4,209,844 issued June 24, 1980.; however, improvements in the synthesizer circuitry which result in higher quality speech, lower data rates and smaller circuit size are incorporated herein. Synthesizer 10 is controlled by microprocessor 14, and generates synthetic speech at speaker 18 by utilization of certain filter parameters stored in ROM 12. While synthesizer 10 is shown being controlled by microprocessor 14, it will be understood by those skilled in the art that any digital control mechanism may control synthesizer 10. In an embodiment disclosed herein, in which synthesizer 10 is implemented in complementary MIS, such as CMOS, it is preferable that microprocessor 14 also be implemented in CMOS to permit both devices to be operated from a single low voltage source, such as a battery. The linear predictive filter utilized in synthesizer 10 is a single multiplier, lattice type filter similar to the filter described in the aforementioned U.S. Pat. No. 4,209,844 which is hereby incorporated by reference.

DETAILED BLOCK DIAGRAM

Figure 2A:
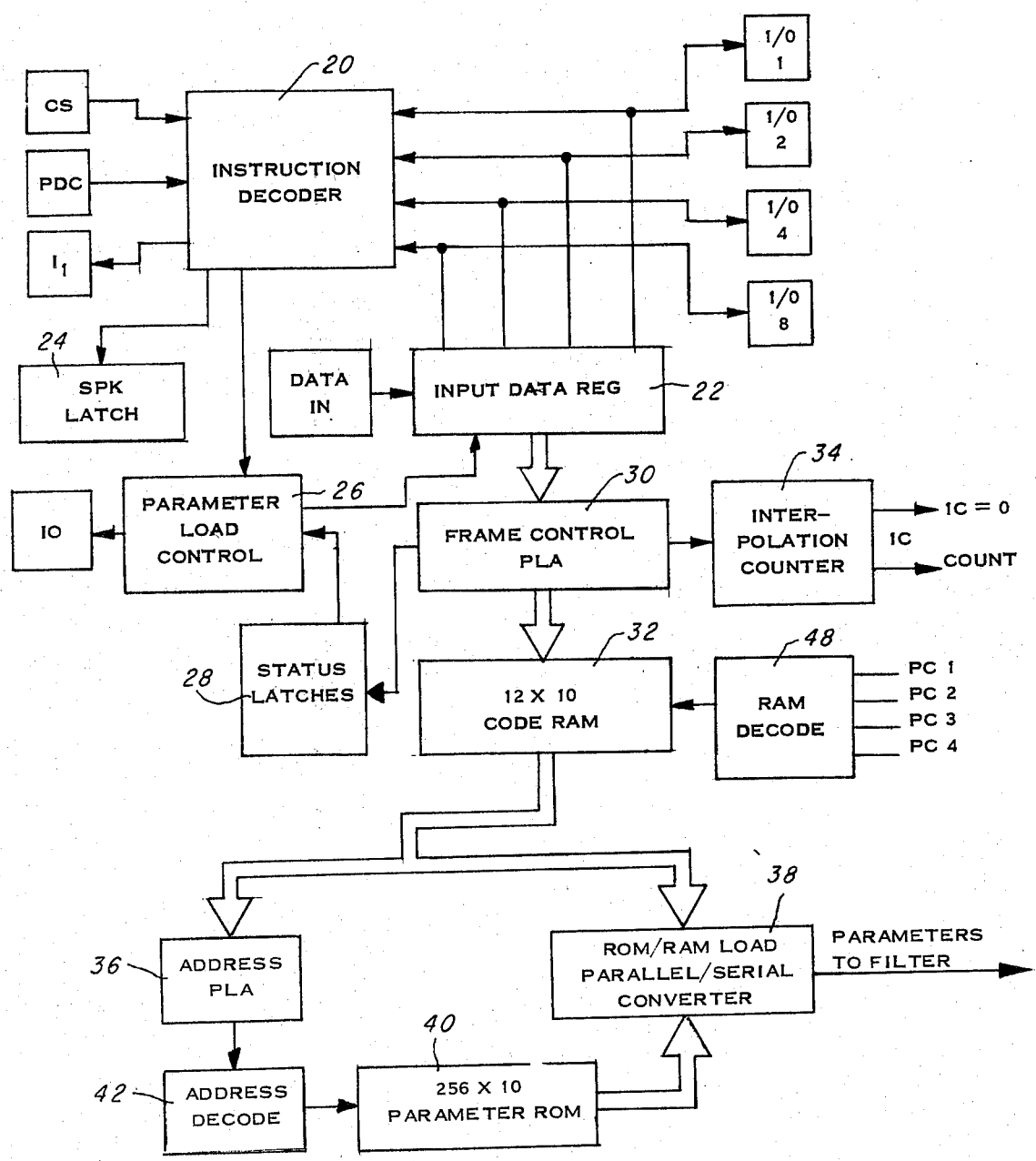
FIGS. 2a and 2b form a detailed block diagram of the speech synthesizer.
Figure 2B:
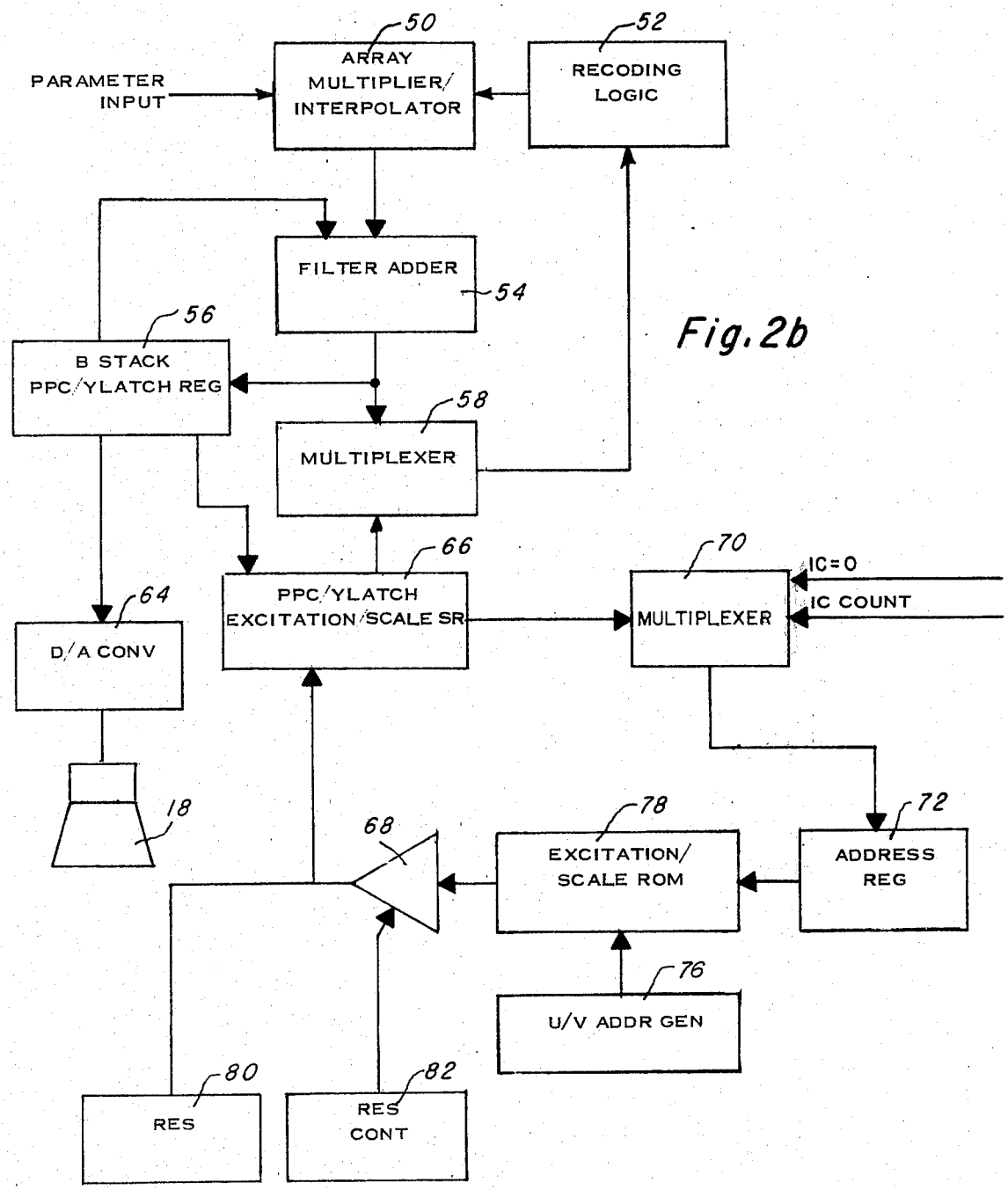

Referring to FIGS. 2a and 2b, there is shown a detailed block diagram of synthesizer 10. Most of the blocks of FIGS. 2a and 2b are shown in greater detail in later figures.

Speech data, comprising either coded or uncoded filter coefficients, is received by synthesizer 10 from ROM 12 at the Data In pad of input register 22. Input register 22 is a ten bit register latch which accepts the speech date serially and outputs the data in parallel to frame control PLA 30.

Input/output pads 1, 2, 4 and 8 accept control data from microprocessor 14, and input the control data to instruction decoder 20. Input/output pads 1, 2, 4 and 8 are bidirectional lines and microprocessor 14 is therefore able to access speech data out of input register 22 as in an alternate embodiment wherein a control mechanism may be utilized to examine such data. Instruction decoder 20 is utilized to decode the instructions which microprocessor 14 inputs to synthesizer 10. Instruction decoder 20 also sets speak latch 24 and parameter load control 26. Speak latch 24 generates logic signals which are utilized throughout synthesizer 10 to indicate that synthetic speech is being generated. Parameter load control 26 is utilized to control the loading of data into input register 22. In addition to instruction control of parameter load control 26, the status latch 28 is also capable of controlling the input of data to input register 22 by detecting certain special states of input data which will later be described in detail.

Frame control PLA 30 is utilized to decode the aforementioned special states of input data which in turn set the special state latches in status latch 28. Frame control PLA 30 also decodes special states of the input data which control how many interpolation steps take place between each frame of data, thereby allowing synthesizer 10 to vary the rate at which data is applied. Interpolation counter 34 is utilized to generate a signal which controls the number of interpolation steps which will be calculated between adjacent frames.

Code RAM 32 is a twelve by ten bit RAM utilized to store an entire frame of data. An entire frame of date will include a pitch parameter, an energy parameter and ten filter parameters. The maximum length of an uncoded parameter is ten bits, and twelve parameters are normally required for each frame.

In one mode of operation, synthesizer 10 generates synthetic speech from uncoded parameters. These parameters are transfered from code RAM 32 to the ROM/RAM load, parallel/serial converter 38, to be serially loaded out to the linear predictive filter. In the alternative mode of operation the coded parameters are utilized by address PLA 36 to generate an address for the appropriate uncoded parameter stored in parameter ROM 40. The uncoded parameters from ROM 40 are inputted to converter 38 and then serially loaded out to the linear predictive filter.

The parameters outputted from converter 38 are coupled into array multiplier/interpolator 50. Array multiplier/interpolator 50 functions similarly to the array multiplier of U.S. Pat. No. 4,209,844, with the additional capability of conducting interpolation steps. Array multiplier/interpolator 50 is coupled to filter adder 54, which is utilized to perform the additions and subtractions necessary to implement the filter function. The output of adder 54 is coupled to B stack, PPC register and Y latch register 56 and to multiplexer 58. Register 56 serves as a temporary store for those intermediate values necessary to perform the filter calculations, and storing the pitch period count (PPC). Register 56 also serves to drive D to A converter 64 with appropriate output values. D to A converter 64 converts the output of the filter to analog signals which drive speaker 18. Multiplexer 58 serves to couple information back up into multiplier/interpolator 50 through recoding logic 52 from adder 54 or the multipurpose shift register 66.

Shift register 66 is a multipurpose shift register utilized to couple excitation data or scale data from ROM 78 into multiplier/interpolator 50 through multiplexer 58 and recoding logic 52. Scale data is utilized by multiplier/interpolator 50 to perform interpolation. Additionally, shift register 66 couples pitch period counter (PPC) information which is utilized to address excitation data in ROM 78. Pitch period counter information is coupled through multiplexer 70 to address register 72 where it is utilized to address excitation data in ROM 78. Unvoiced address generator 76 is utilized during unvoiced periods of speech to randomly address one of two excitation values, utilized during unvoiced speech, which are stored in ROM 78.

Tri-state buffer 68, in an alternative embodiment of the present invention, is utilized to control the excitation input to shift register 66. Synthesizer 10 may be utilized as a residually excited synthesizer, in a vocoder application, for example. In such an alternative embodiment a residual excitation signal is applied to residual input pin 80, and tri-state buffer 68 is disabled by a control signal at residual control pin 82. In this alternative embodiment, parameters are inputted to multiplier/interpolator 50 from an external source, rather than through converter 38.

SYSTEM TIMING

The synthesizer 10 is preferably inplemented using precharged conditional discharge type logics. Thus, four clock signals, $\phi 1-\phi 4$ are appropriate for use in such precharge, conditional discharge logic. There are two main clock phases ($\phi 1$ and $\phi 2$) and two precharge clock phases ($\phi 3$ and $\phi 4$). Phase $\phi 3$ goes high during the first half of phase $\phi 1$ and serves as a precharge therefor. Phase $\phi 4$ goes high during the first half of phase $\phi 2$ and serves as a precharge therefor. A set of clocks $\phi 1-\phi 4$ is required to clock one bit of data, and thus correspond to one time period.

Timing signals, labelled TI-T22, each having a period on the order of 4.5 microseconds are utilized throughout the system. Selecting a time period on the order of 4.5 microseconds permits data to be outputted from synthesizer 10 at a 10 kilohertz rate (i.e. at a 100 microsecond period) which provides for a frequency response of 5 kilohertz in the digital-to-analog converter 64. It will be appreciated by those skilled in the art, however, that depending upon the frequency response desired, the number of reflection coefficients utilized and the type of logics utilized, the periods or frequencies of the clocks and clock phases may be substantially altered.

Thirteen parameter count (PC) signals are also utilized in the depicted embodiment of the invention. The first twelve of these, PC=0 through PC=11 correspond to the times when the energy, pitch, and K1-K10 reflection coefficients are available in parallel-serial converter 38. Each of the first twelve parameter counts comprise two cycles, referred to as the A and B cycles. Each cycle, whether A or B, begins at T18 and ends at the next T18. During each parameter count the value in parallel-serial converter 38 is utilized as a target value for interpolation with an existing value stored in a recirculating portion of multiplier interpolator 50. During the A cycle, the appropriate existing parameter is withdrawn from the recirculating portion of multiplier/interpolator 50, and during the B cycle the newly interpolated value is reinserted.

The thirteenth parameter count, PC=12, is provided for timing purposes so that all twelve parameters are interpolated once each 2.5 millisecond, and for indicating that period of time during which variable frame rate data is inputted.

As was discussed earlier with respect to interpolation, the synthesizer of the present invention is capable of performing from zero to one hundred twenty seven interpolations between each frame of parameters inputted. A new interpolation count signal is available from interpolation counter 34 every 2.5 milliseconds, and is utilized to address a scale value in excitation/scale ROM 78. Thus the period for interpolation remains constant at 2.5 milliseconds, regardless of the number of interpolation steps between two values.

PARAMETER DATA COMPRESSION

New parameters may be inputted to synthesizer 10 at a fifty hertz frame rate. It will be seen subsequently that in multiplier/interpolator 50, the pitch data, energy data and reflection coefficients are utilized as ten bit binary numbers. If each of the twelve parameters were updated with a ten bit binary number at a fifty hertz rate, a $12 \times 10 \times 50$, or 6,000 hertz bit rate would result. Therefore, in order to lower the bit rate, the data compression scheme of U.S. Pat. No. 4,209,836, which is incorporated herein by reference, may be utilized. In FIG. 6 of the aforementioned U.S. Pat. No. 4,209,836, there is shown a representation of four different lengths of data frames. One frame, labelled "voiced frame" has a length of 49 bits, while another, labelled "unvoiced frame", has a length of 28 bits. A "repeat frame" has only ten bits and a "zero energy" frame has only four bits. In an alternative embodiment to the coding scheme of U.S. Pat. No. 4,209,836, a direct, uncoded, ten bit binary number may be loaded for each parameter. The input circuitry of synthesizer 10 is capable of accepting either format.

SYNTHESIZER LOGIC DIAGRAMS

Various portions of synthesizer 10 will now be described in detail with reference to FIGS. 3 through 14c, which depict in detail the logic circuits which implement synthesizer 10. Certain well known sections of the block diagram depicted in FIGS. 2a and 2b are not included in FIGS. 3-14c. The following discussion, with reference to FIGS. 3-14c, refers to logic signals available at many points in the circuit. Synthesizer 10, in the embodiment disclosed, is implemented in complementary MIS, such as CMOS. It must be remembered that in CMOS devices, a logic zero corresponds to a zero voltage, that is Vss. Further, the P channel devices depicted in the aforementioned figures are conductive when a logic zero is applied to their respective gates. Also, a logic one in CMOS devices corresponds to a positive voltage, +3V in the embodiment disclosed (Vdd). Therefore, the N channel devices depicted are conductive when a logic one is applied to their respective gates. When a logic signal is referred to which is unbarred, the signal is to be interpeted as "True" logic, that is, a binary one indicates the presence of Vdd and a binary zero indicates the presence of Vss. Logic signals which are barred indicate "False" logic and the aforementioned relationships are reversed. It should also be understood that a numeral in a clocked gate indicates which of the clock phases is utilized, as a precharge clock. The letter "S" in a gate indicates the gate is statically operated.

INPUT DATA REGISTER

Figure 3:
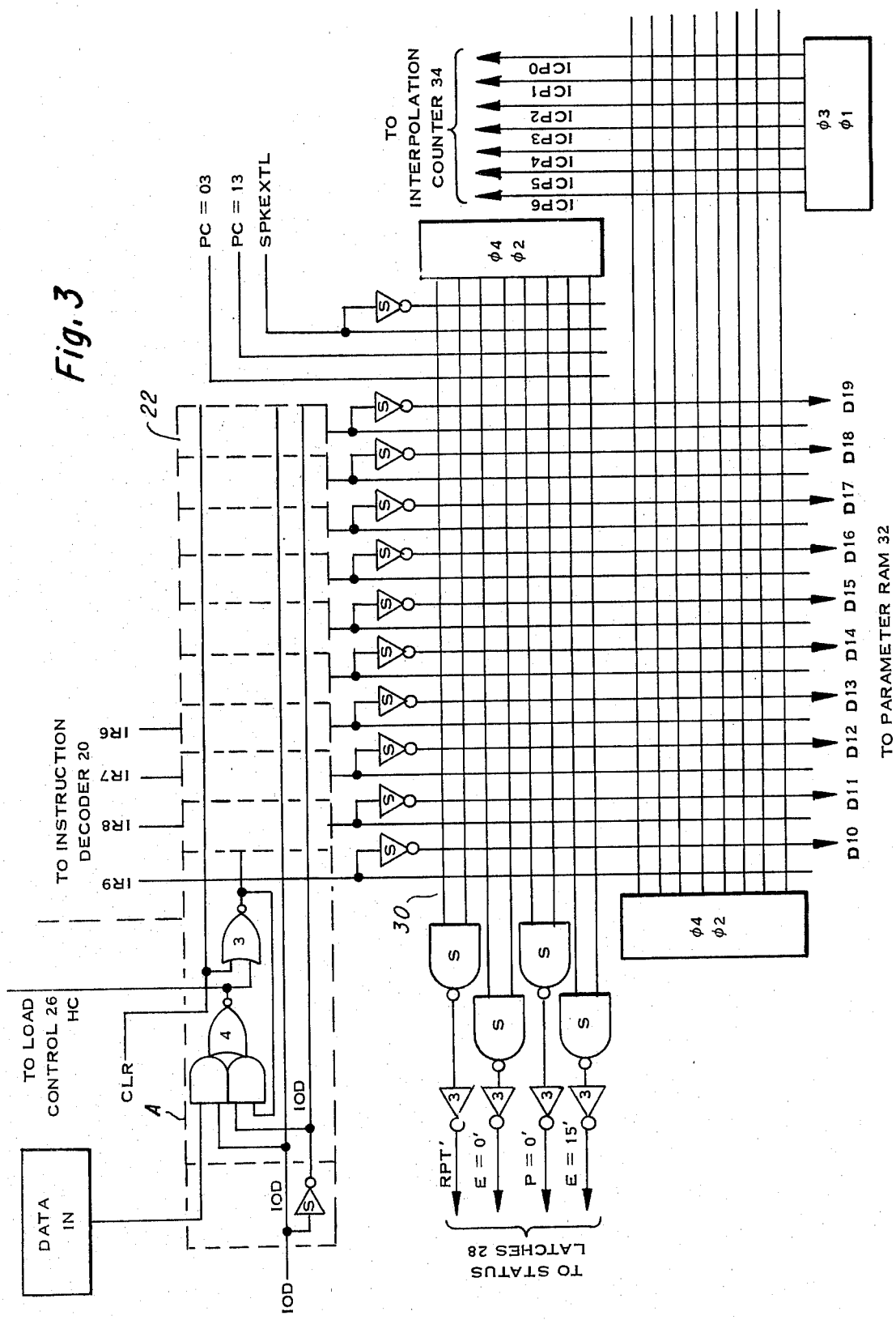
FIG. 3 is a logic diagram of the input data register and frame control PLA.

Referring to FIG. 3, there is shown a logic diagram of input data register 22. Input data register 22 is a ten stage register, the first stage of which is shown within the detail marked A. Input data register 22 is ten stages in length to allow synthesizer 10 to accommodate uncoded parameters up to ten bits long, or, in an alternative embodiment, coded parameters of the type utilized in U.S. Pat. No. 4,209,836.

Certain signals are utilized to control input data register 22. A clear signal (CLR) is generated by parameter load control 26, and is utilized to clear input data register 22 at time T22, during speech. The IO, ROM control signal, is delayed to form IOD, which is utilized to clock bits of data into input data register 22. An optional control signal, HC, is utilized as a modified Huffman code. This signal is utilized during variable frame rate operation to control the receipt of the Huffman code, which, those skilled in the art will recall, is a variable length code.

FRAME CONTROL PLA

Frame control PLA 30 is shown in FIG. 3. PLA 30 is a programmable PLA, and is therefore shown without gates. PLA 30 is utilized to detect certain special states which occur in the input data. Among those special states are those which affect the length of each individual frame, including: the Repeat state (RPT); the "Energy equal zero" state (E=0); the "Pitch equal zero" state (P=0); and the "End of File" or "Energy equal fifteen" state (E=15).

Additionally, the lower half of PLA 30 also decodes the Huffman code mentioned earlier, or a standard binary code, either of which may be utilized during variable frame rate operation. The decoded variable frame rate data is utilized to generate the signals ICP6-ICP0, which are in turn utilized to control interpolation counter 34. The parameters in input data register 22 are also passed through PLA 30 to the parameter RAM 32. These signals are shown as DI0-DI9.

INTERPOLATION COUNTER

Figure 4:
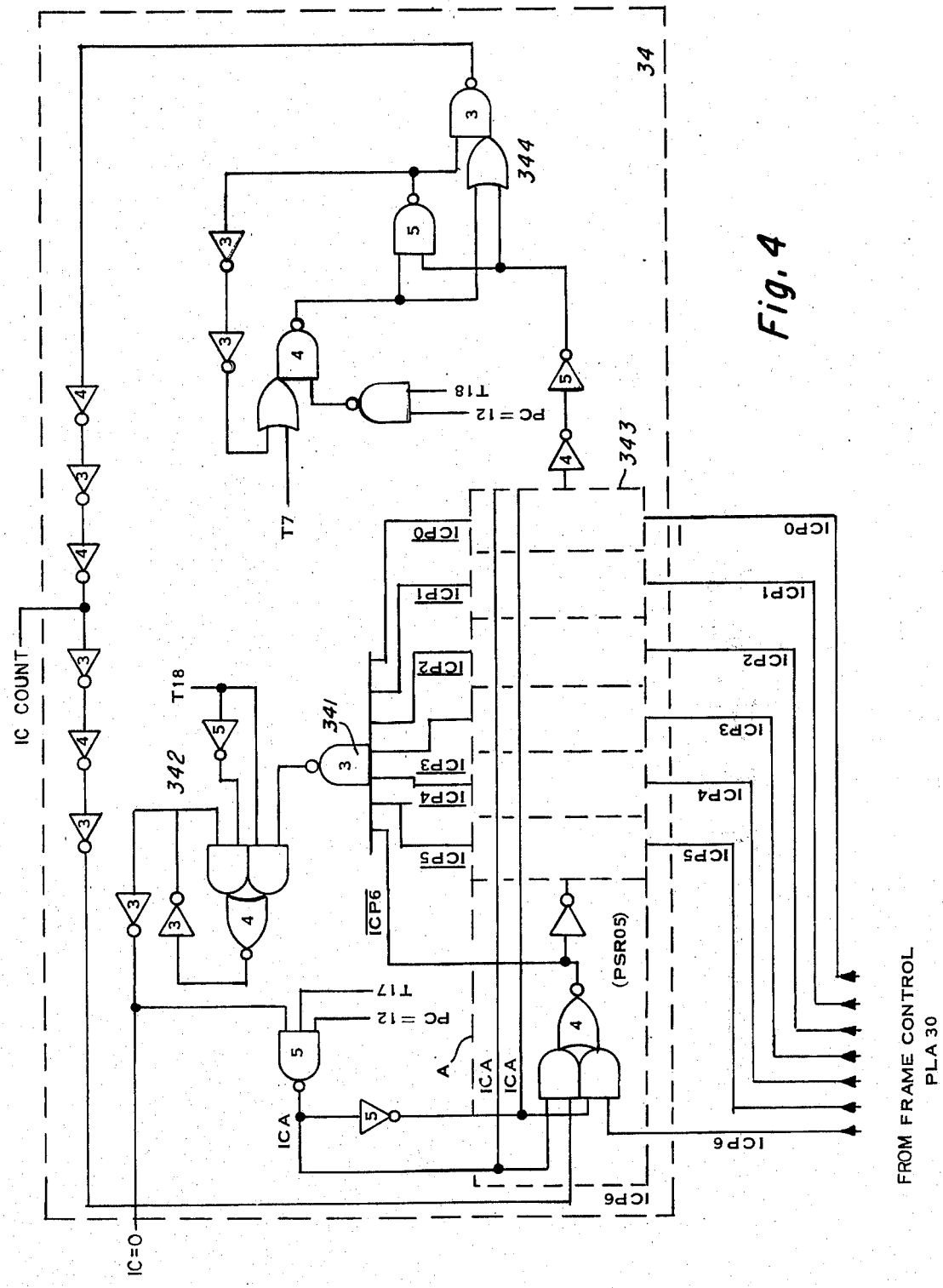
FIG. 4 is a logic diagram of the interpolation counter circuitry.

Interpolation counter 34 is shown in detail in FIG. 4. Previous attempts at variable frame rate voice synthesis have had difficulty due to the problem of varying lengths of time between each frame, and the question of interpolation therein. Interpolation counter 34 is capable of utilizing the variable frame length data to control the number of interpolation steps between each frame. Thus, during rapidly changing speech, few or no interpolations take place between data frames. However, during slowly changing speech, up to one hundred twenty seven interpolations may take place.

Register 343 is a seven stage shift register, which is initially set by the signals ICP6-ICP0. The first stage of register 343 is shown within the detail marked "A". The signals ICP6-ICP0 initially set register 343 to some number, the interpolation count, which is between zero and one hundred twenty seven. The interpolation count initially set into register 343 is clocked out and around through a series of inverters which generate an appropriate amount of delay. Gates 344 are utilized to selectively increment the interpolation count after each interpolation. The new interpolation count is then shifted back into register 343, whose gate 341 is utilized to detect the "interpolation count equal zero" (IC=0) state. When the IC=0 state is detected, gates 342 are utilized to latch this condition. The IC=0 condition is utilized throughout synthesizer 10 to indicate the end of the interpolation, and allow the entry of new data. The interpolation count is outputted from interpolation counter 34 to be utilized as part of the address in excitation/scale ROM 78.

SPEAK LATCH

Figure 5:
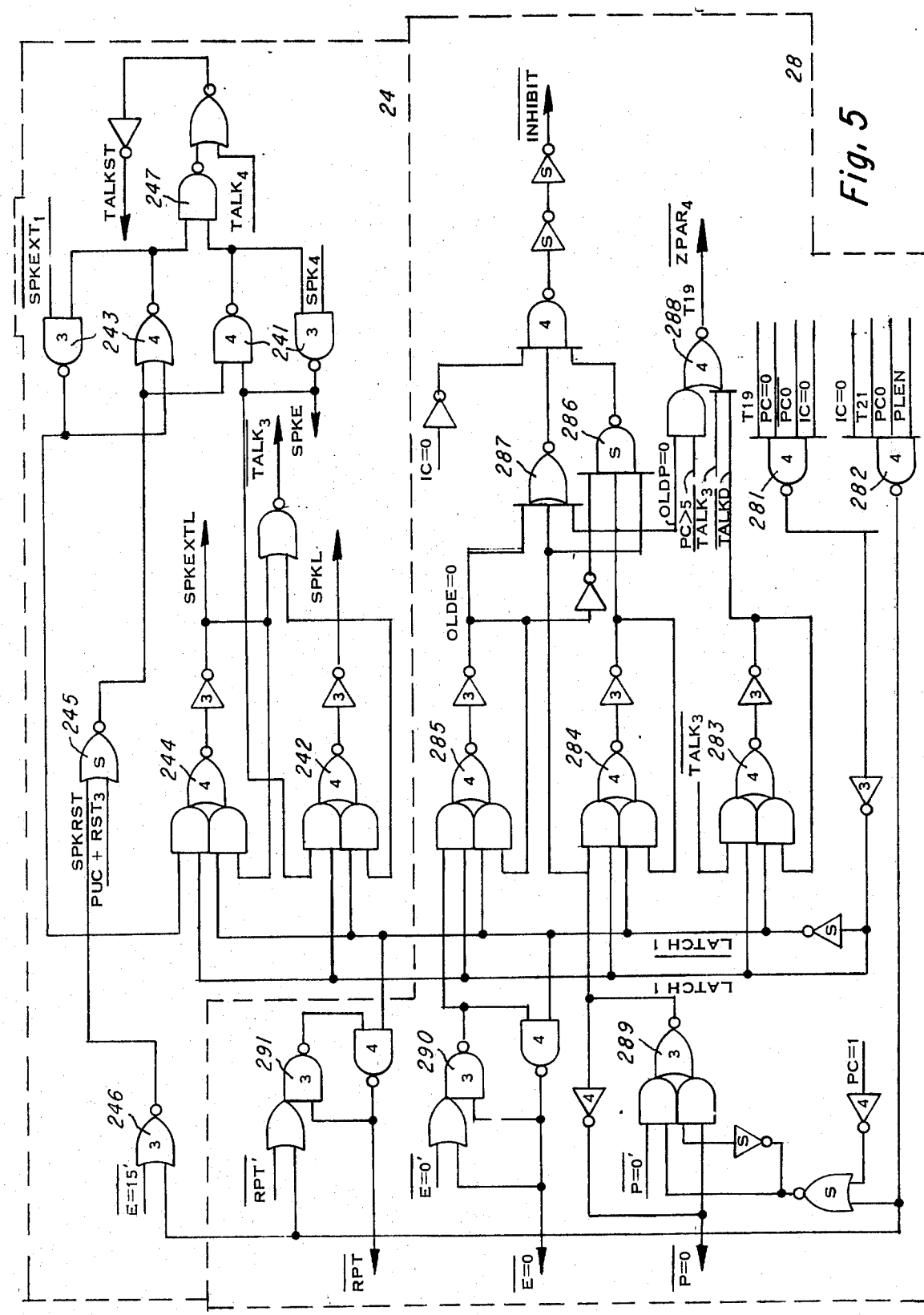
FIG. 5 is a detailed logic diagram of the speak latch circuitry and status latch circuitry.

FIG. 5 shown a detailed logic diagram of speak latch 24. Speak latch 24 consists of four latch circuits utilized to set and hold signals which indicate synthesizer 10 is generating speech. Gates 241 form a latch which has SPK as its input. SPK is generated by instruction decoder 20 in response to an input command which causes speech to be generated utilizing coded speech parameters. Instruction decoder 20 may also generate SPKEXT in response to an input command which causes speech to be generated utilizing uncoded, ten bit, binary parameters, as discussed earlier with respect to an alternate method of operation. The SPK command is utilized to generate the "speak enable" (SPKE) command out of gates 241, and to set latch 242 to generate SPKL. The SPKEXT command will set a latch 244 comprised of gates 243, which in turn will set latch 244 and generate SPKEXTL. The occurence of either SPKEXTL or SPKL will in turn generate the TALK signal. Gate 245 is utilized to reset the latches comprised of gates 241 and 243 during a power up, or after a reset signal. The speak reset (SPRST) command is generated by gate 246 by receipt of an "end of file" of "Energy equal fifteen" (E=15) code. Additionally, gate 247 is utilized to latch out a "talk status" signal which indicates synthesizer 10 is generating speech. Thus, the logic signals outputted by speak latch 24 are utilized throughout synthesizer 10 to indicate the generation of speech.

STATUS LATCHES

Status Latches 28 are also shown in detail in FIG. 5. The function of the various status latches is identical to the function described in U.S. Pat. No. 4,209,836, and will only be described briefly herein.

Latching signal LATCH 1 is generated by gate 281 at the beginning of a frame of data, the inputs to gate 281 all signifying a frame start. The LATCH 1 signal will strobe any SPKEXTL or SPKL signal at latch 244 or 242 in the speak latch 24, and will additionally strobe the output of latches 289 (the "Pitch equal zero" (P=0 latch) and 290 (the "Energy equal zero" (E=0) latch into latches 284 and 285 to generate Old E=0 and Old P=0. The contents of latches 284 and 285 are utilized in conjunction with the P=0 signal to generate the INHIBIT signal. As in the synthesizer of U.S. Pat. No. 4,209,836, the INHIBIT signal is utilized to inhibit interpolations in certain conditions. During transition from voiced to unvoiced speech, or unvoiced to voiced speech, it is advantageous to insert new parameters directly, without interpolations. Also, interpolations are not desirable when transitioning from silience to speech.

As was explained in detail in U.S. Pat. No. 4,209,836, it has been determined that fewer parameters are required to accurately represent unvoiced speech. Therefore, gate 288 is utilized to generate a "zero parameter" (ZPAR) signal during unvoiced speech (Old pitch equal zero) after the parameter count has reached five (PC 5). Gate 288 also zeroes all parameters during non-speaking periods, by utilizing the TALK signal and the TALKD signal generated by latch 283.

INSTRUCTION DECODER

Figure 6A:
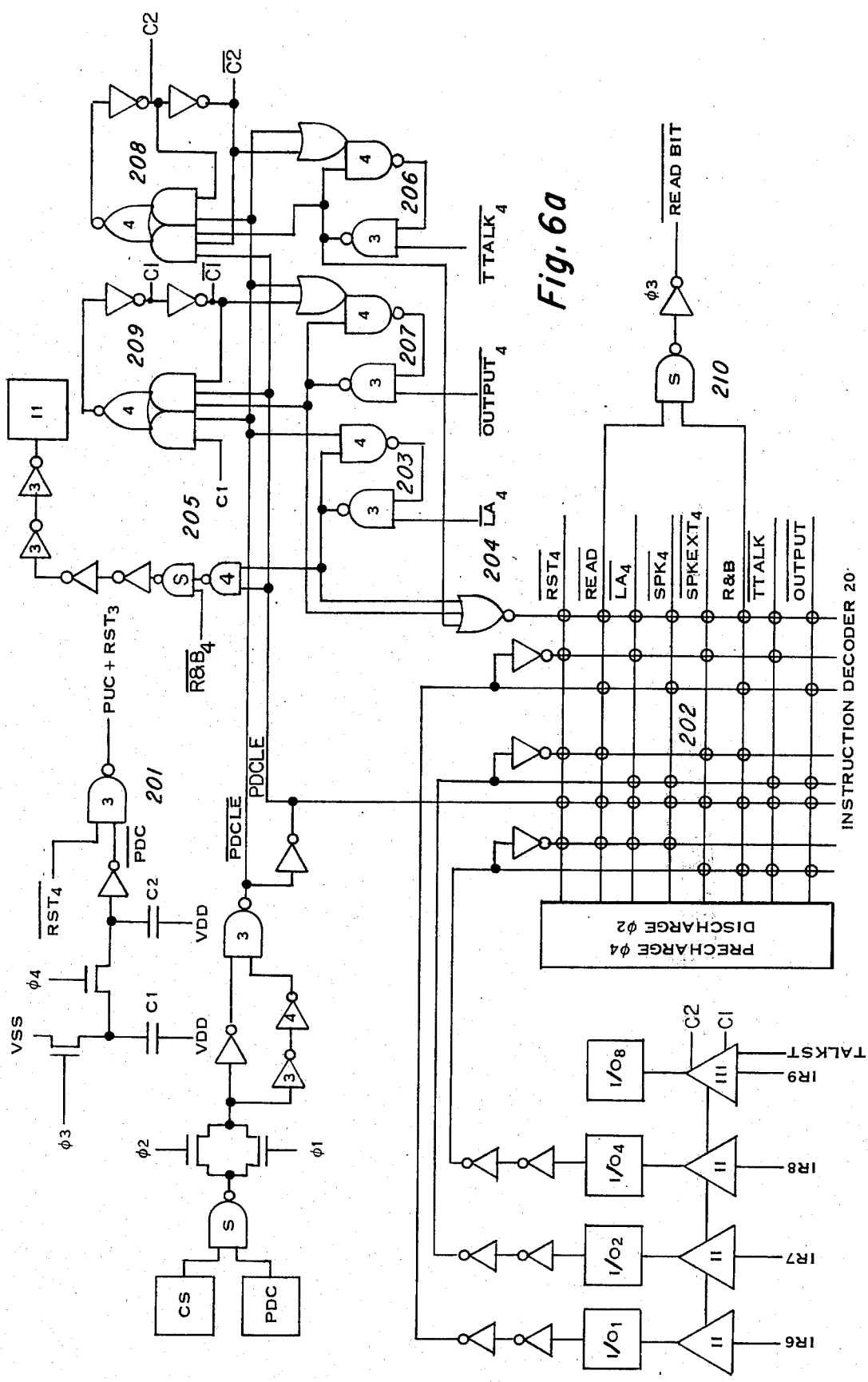

Referring to FIG. 6a, there is shown a detailed logic diagram of instruction decoder 20. Instructions from microprocessor 14 are input to synthesizer 10 on I/0 pins I/01, I/02 and I/04. The instructions are clocked in each time a Processor Data Clock (PDC) signal is generated. The instructions are decoded by PLA 202. Many of the instructions are identical to those utilized by the synthesizer of U.S. Pat. No. 4,209,836. A brief description of each instruction and its function is listed below.

The "Reset" (RST) instruction is a software reset instruction which is utilized by gate 201 in conjunction with the synthesizer "power up clear" (PUC) signal to form PUC+RST. This instruction is then utilized to reset speak latch 24.

The "Read" (READ) instruction is a signal from microprocessor 14 telling synthesizer 10 to access one data bit from ROM 12.

The "Load Address" (LA) instruction is an instruction which requires two PDC signals to execute. On the first PDC, the LA instruction is latched into latch 203. Latch 203 disables PLA 202 so that no command is decoded. On the second PDC, gate 205 is enabled, causing instruction decoder 20 to output an I1 signal to ROM 12. The I1 signal instructs ROM 12 to load four bits of address.

The "Speak" (SPK) instruction causes synthesizer 10 to begin synthesizing speech utilizing coded speech parameters. The SPK instruction is utilized throughout synthesizer 10.

The "Speak External" (SPKEXT) instruction causes synthesizer 10 to begin synthesizing speech utilizing direct, uncoded, parameter loading, as in the alternate embodiment discussed herein.

The "Read and Branch" (R+B) instruction is an instruction to ROM 12 to internally read data and load the data back into its address register, to allow indirect addressing.

The "Test Talk" (TTALK) instruction and the "output" (OUTPUT) instruction both require three PDC signals to execute. The TTALK instruction sets latch 206 and disables PLA 202 through gate 204. On the next PDC, the output of latch 206 is clocked through gate 208 to generate signal C2. Signal C2 is utilized to control the buffer between the I/08 and IR9, allowing the "talk status" (TALKST) signal to be output on I/08. Thus, microprocessor 14 can determine whether synthesizer 10 is talking. The next PDC signal shuts off the C2 signal and resets latch 206. The OUTPUT instruction also requires three PDC signals to execute. Latch 207 and gate 209 interact in the same manner as latch 206 and gate 208. However, in the case of the OUTPUT instruction, a C1 signal is generated which enables the buffer to all of the I/O pads. In this manner, microprocessor 14 can access data in ROM 12, through synthesizer 10.

Figure 6B:
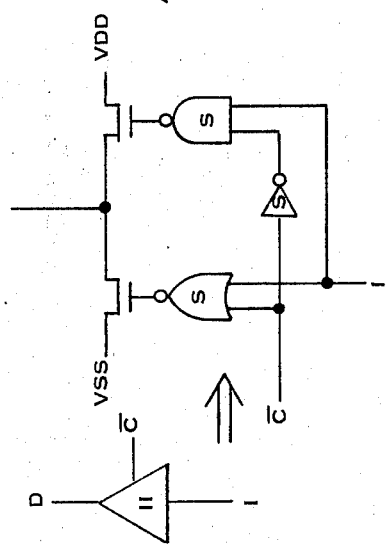
Figure 6C:
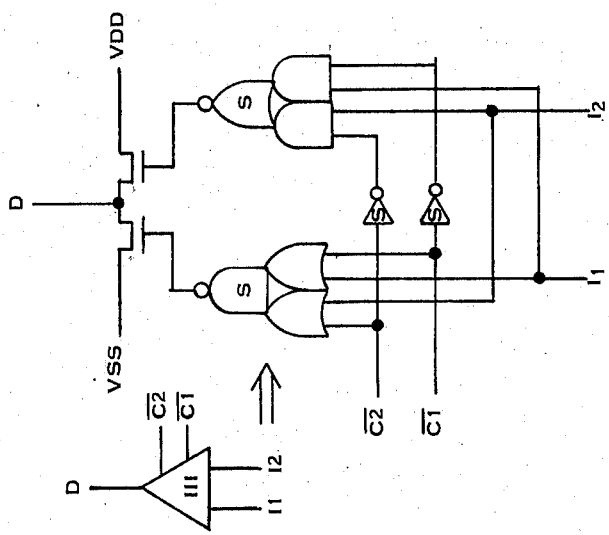

Detailed diagrams of the buffers for the I/0 pads are also shown in FIGS. 6b and 6c.

PARAMETER LOAD CONTROL

Figure 7:
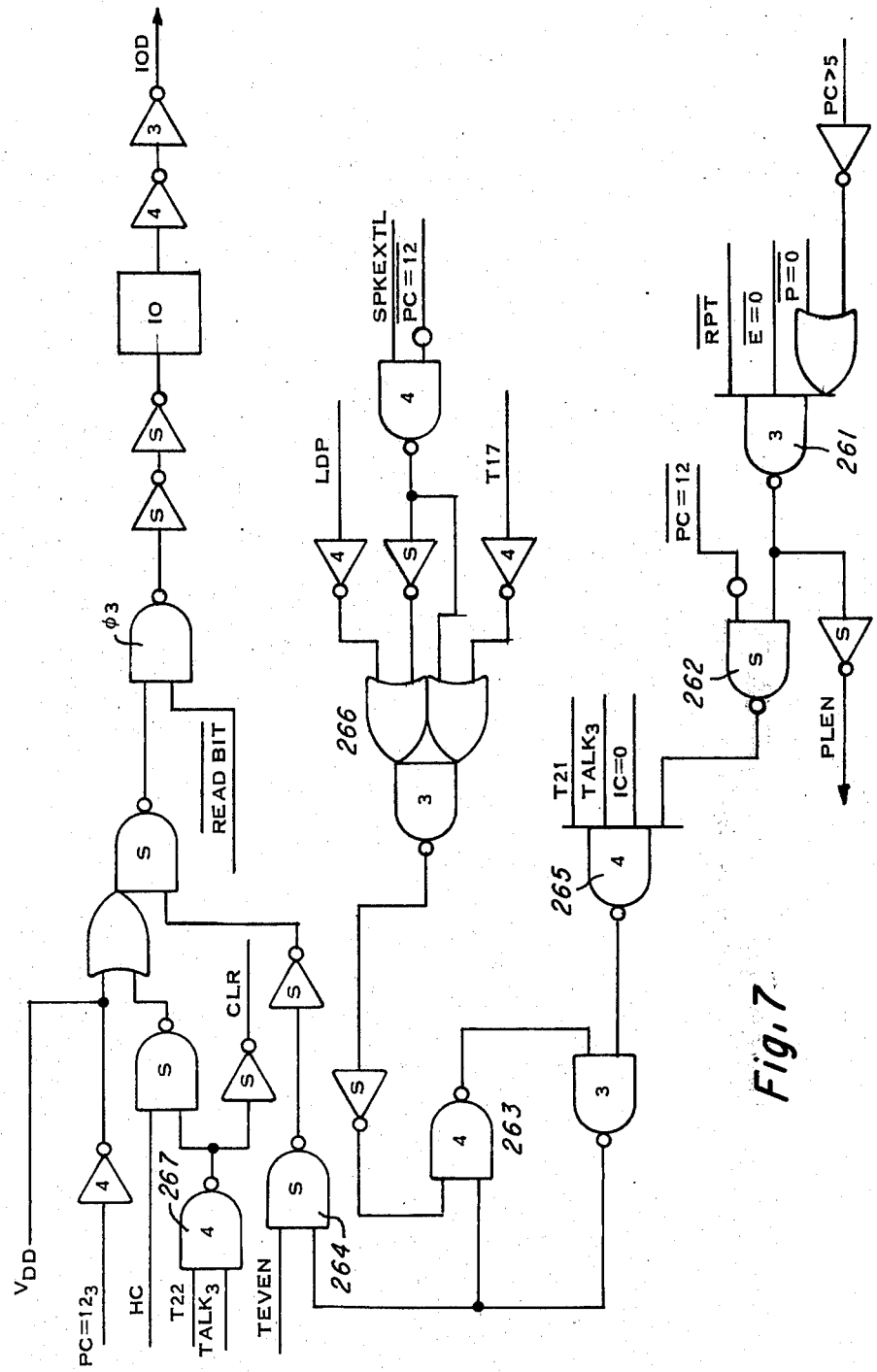
FIG. 7 is a detailed logic diagram of the parameter load control circuitry.

Parameter load control 26 is shown in detail in FIG. 7. Parameter load control 26 generates the I0 signal to ROM 12. The I0 signal and the I1 signal, generated by instruction decoder 20, control ROM 12 in the manner described in U.S. Pat. No. 4,209,836. The I0 signal is utilized to clock data out of ROM 12.

Gate 261 is utilized to generate the Parameter Load Enable (PLEN) signal which allows parameters to be written into code RAM 32. PLEN is generated unless one of three conditions exist at the input of gate 261. When a repeat (RPT) bit is detected, the PLEN signal stops. A RPT bit is utilized when old parameters are to be repeated, thus no new parameters should be loaded. When the Energy parameter is zero (E=0), indicating silence, the PLEN signal is disabled. Lastly, as described in U.S. Pat. No. 4,209,836, during unvoiced speech the system utilizes fewer parameters to accurately represent speech. Thus, when the pitch parameter is equal to zero (P=0) and the parameter counter indicates that the first six parameters have been loaded (PC>5), PLEN is disabled.

Gate 262 is utilized during variable frame rate operation to allow the frame rate data to be loaded (at PC=12) despite a condition which would preclude loading parameters. Gate 266 is utilized to set latch 263, the output of which is utilized in conjunction with the even clock times (TEVEN) by gate 264 to generate I0 signals. Gate 266 is utilized to distinguish between loading coded or direct parameters, since in the embodiment disclosed coded parameters consist of two to seven bits and direct parameters consist of ten bits. Gate 265 is utilized to reset latch 263. Gate 267 is utilized to generate the CLR signal which clears the input register.

RECODING LOGIC

Figure 10A:
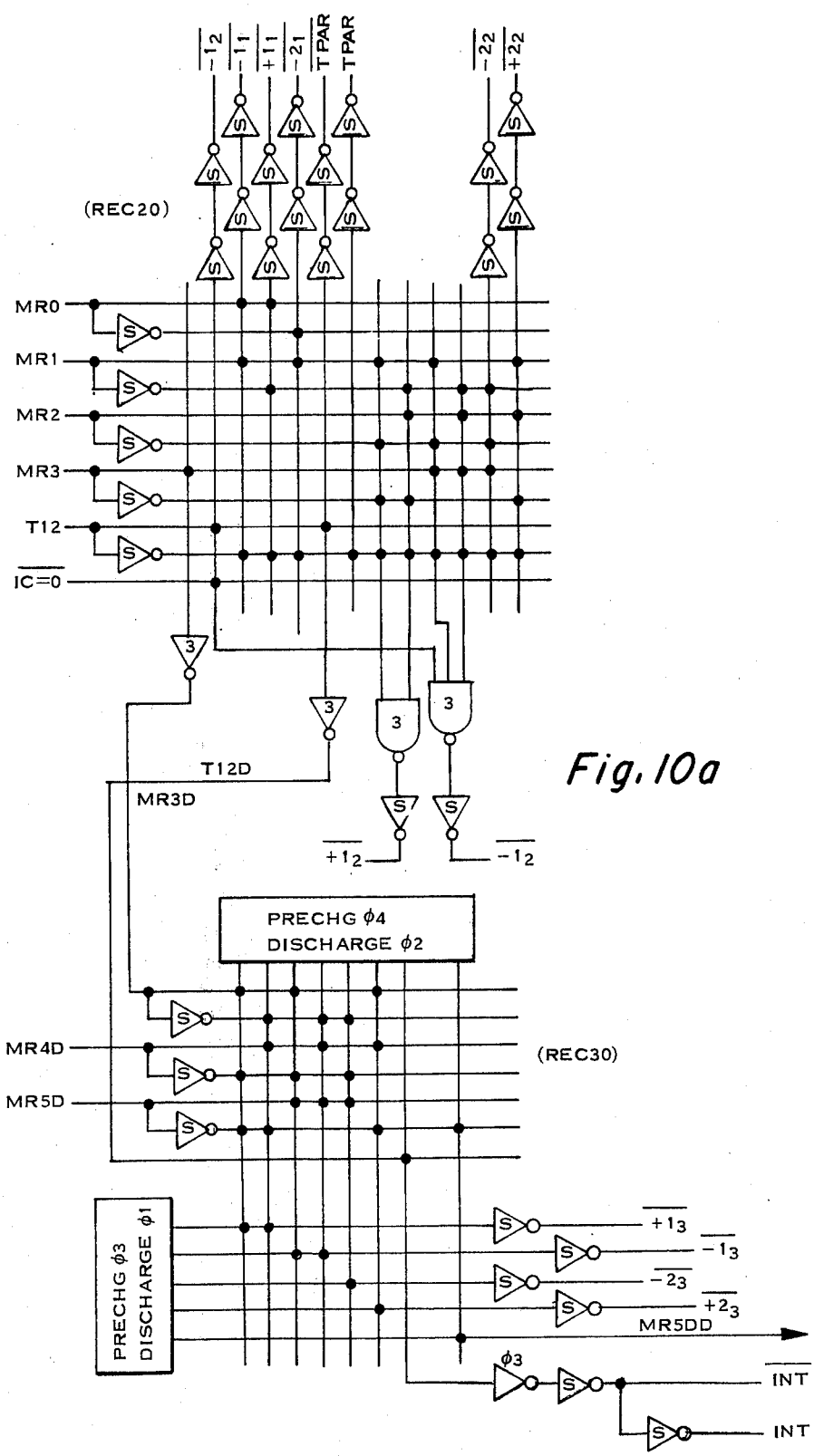
FIGS. 10a–10e are detailed logic diagrams of the recoding logic.
Figure 10B:
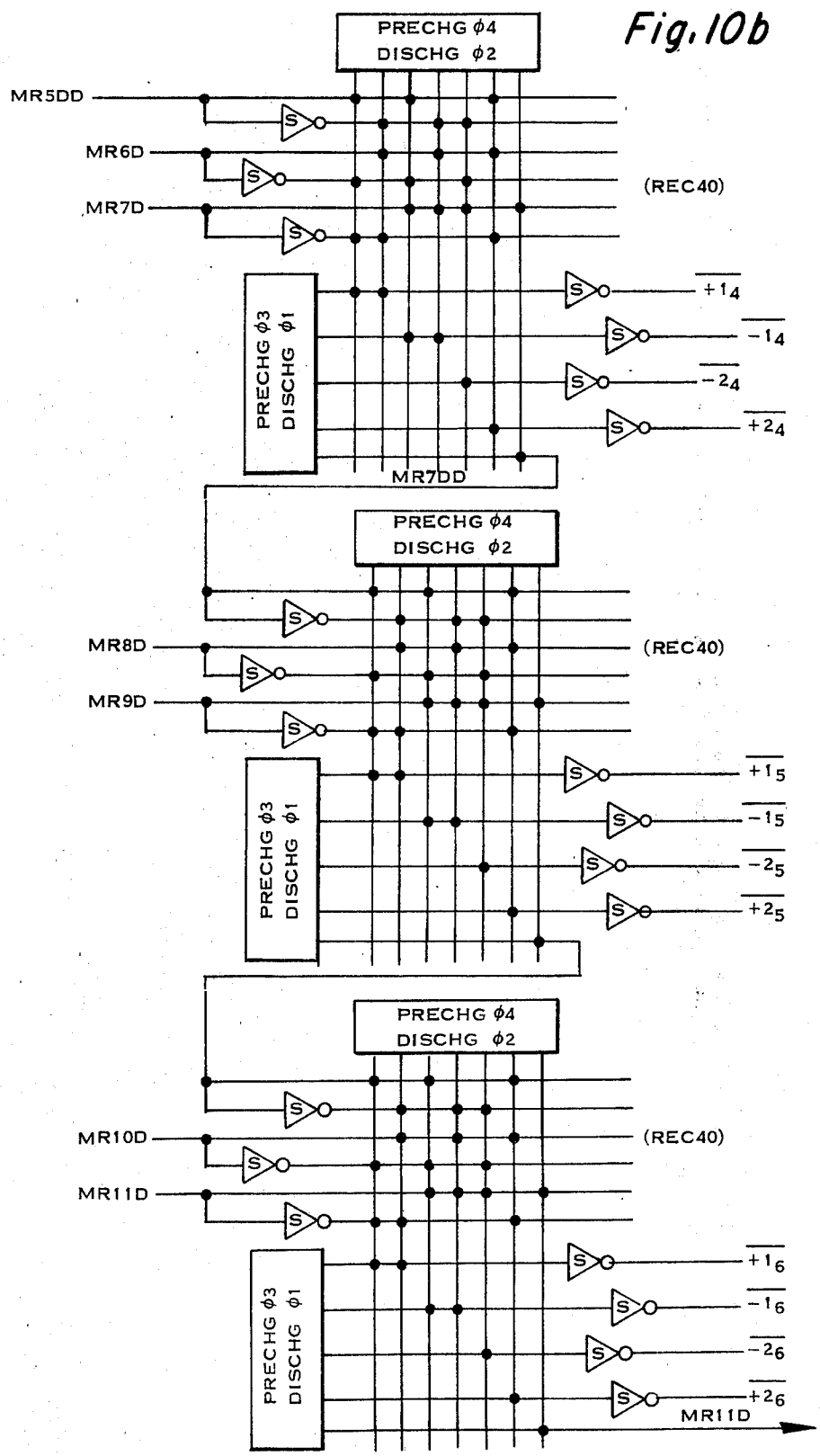
Figure 10C:
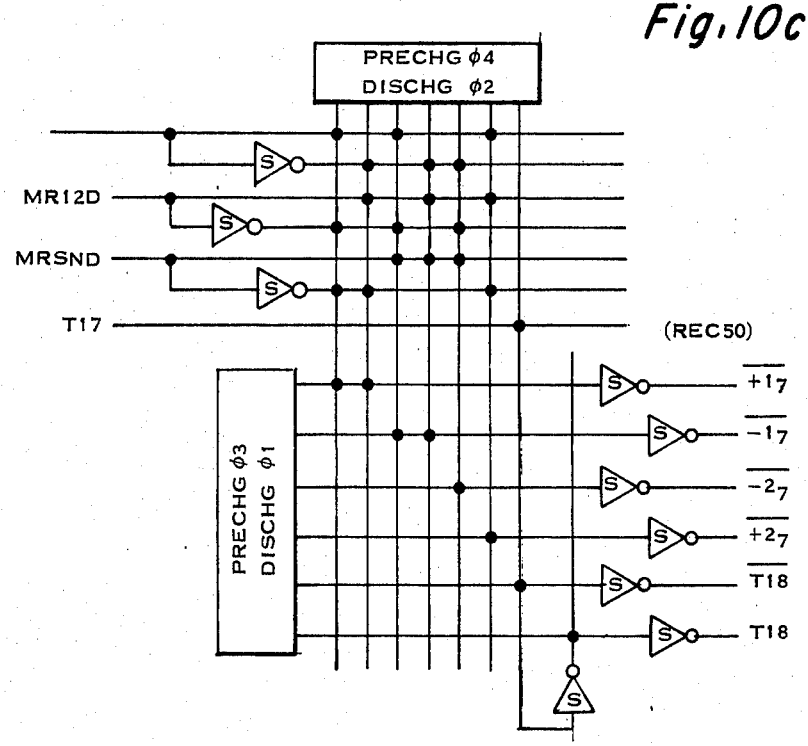
Figure 10D:
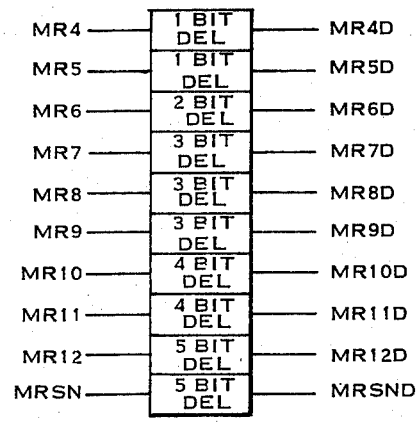
Figure 10E:
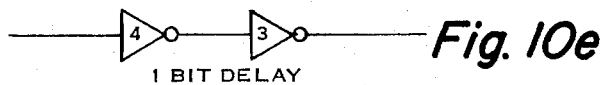

Recoding logic 52 couples the outputs of multiplexer 58 to multiplexer/interpolator 50. Recoding logic 52 is shown in detail in FIGS. 10a–10e. Recoding logic 52 consists of six stages, three of which are identical, as seen in FIG. 10b. The first stage of recoding logic 52 (labelled REC 20) generates signals for the first two stages of multiplier/interpolator 50. The subscripts on each control signal indicate to which stage of multiplier/interpolator 50 it is coupled. The third stage of multiplier/interpolator 50 and the seventh stage require additional control signals due to the interpolation function therein. The INT signal discussed in the interpolation section is generated in the section of recoding logic 52 labelled REC 30 in FIG. 10a, and the T18 signal for the seventh stage is generated by the stage labelled REC 50 in FIG. 10c. Recoding logic 52 outputs $+2$, $-2$, $+1$ and $-1$ to each stage of multiplier/interpolator 50 with the exception of stage one which receives only $+1$, $-1$, and $-2$ outputs. Effectively, as seen in U.S. Pat No. 4,209,836, recoding logic 52 permits multiplier/interpolator 50 to process, in each stage thereof, two bits of information in lieu of one, by utilizing Booth's Algorithm. Booth's Algorithm is explained in "Theory and Application of Digital Signal Processing", published by Prentice-Hall 1975, at

MULTIPLIER/INTERPOLATOR

Figure 8A:
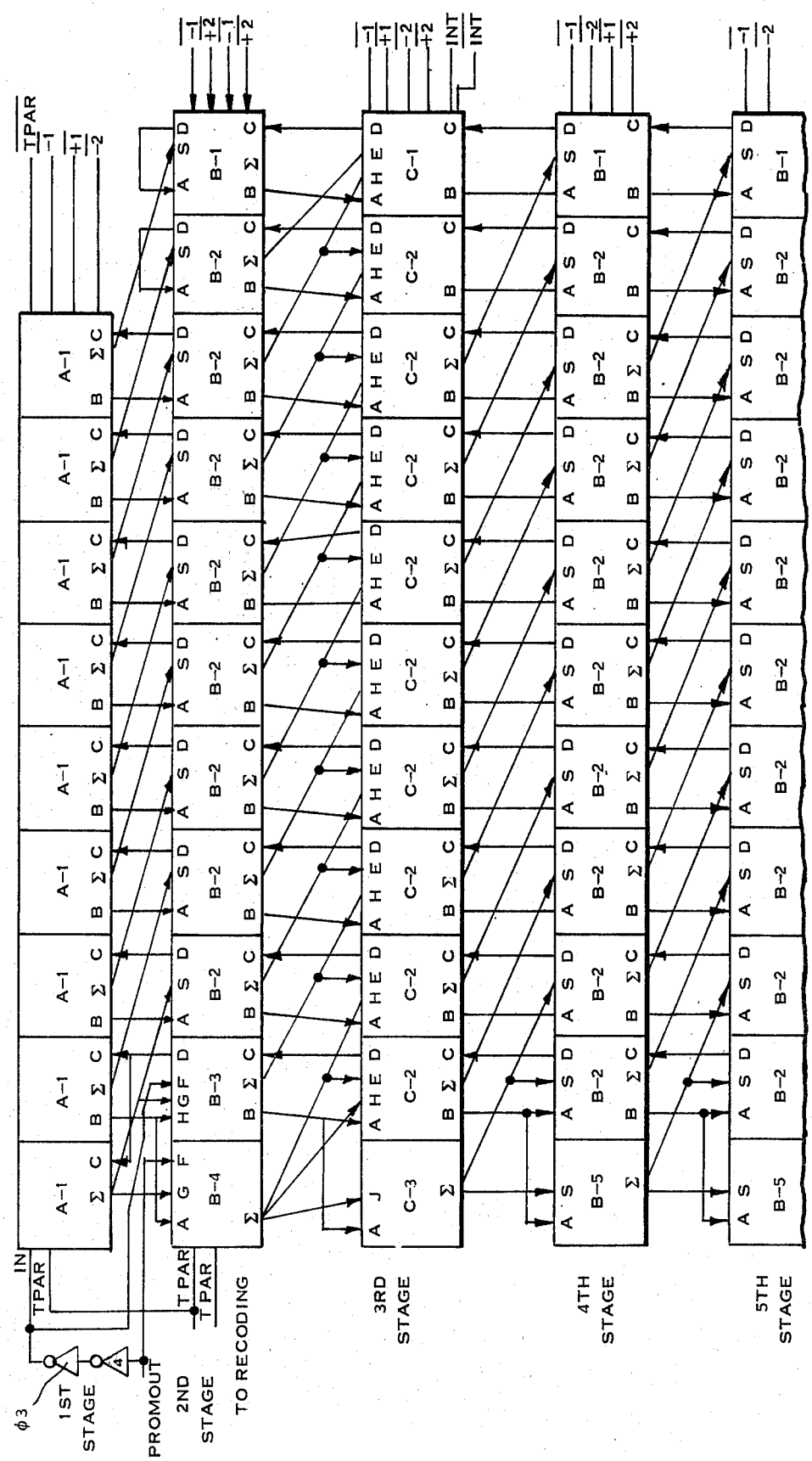
FIGS. 8a and 8b form a composite block diagram of the array multiplier.
Figure 8B:
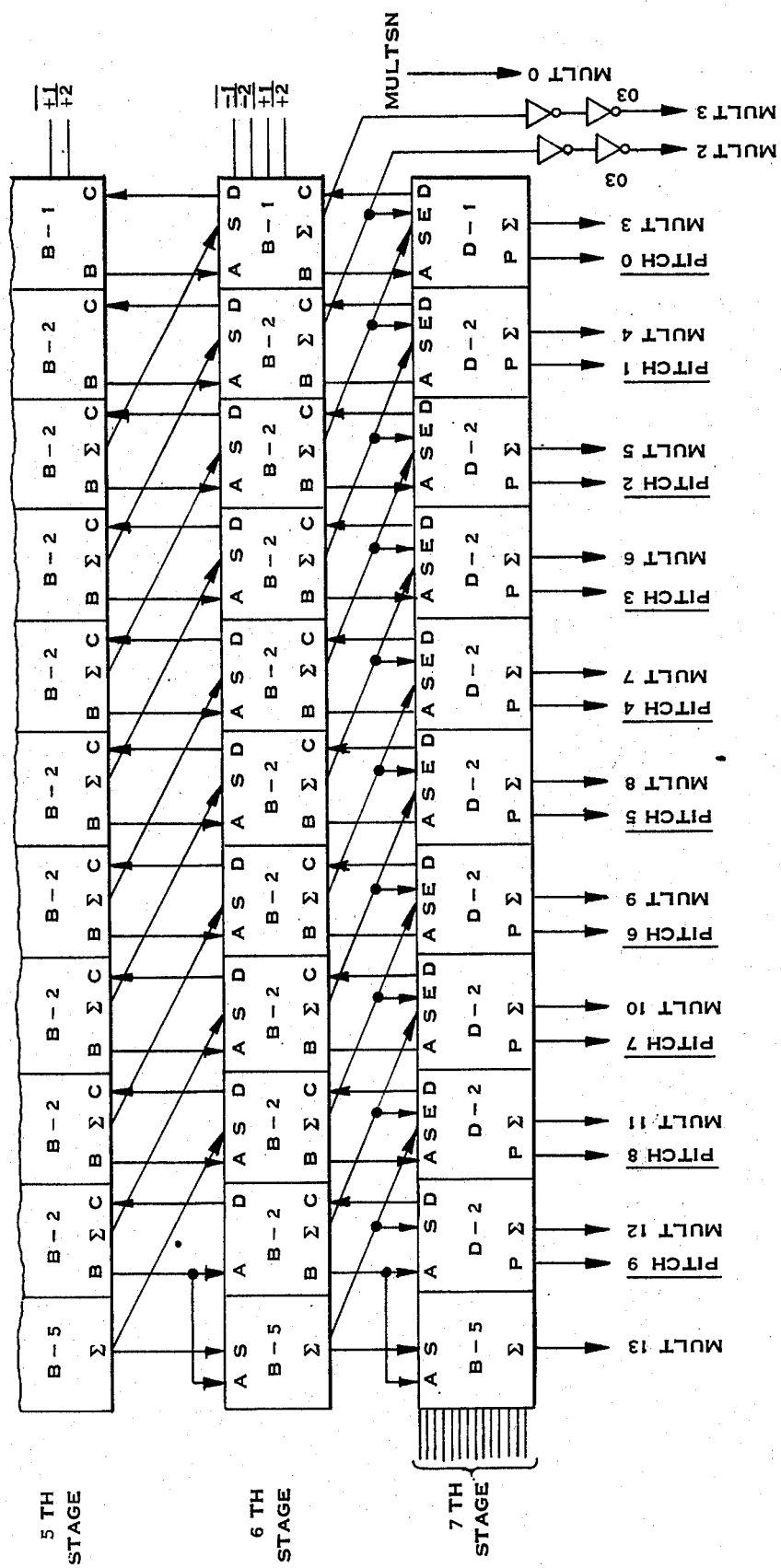

A block diagram of multiplier/interpolator 50 is formed by the composite of FIGS. 8a and 8b. Multiplier/interpolator 50 is an array multiplier. Array multipliers are sometimes referred to as "Pipeline Multipliers". For example, see "Pipeline Multiplier" by Granville Ott, published by the University of Missouri. Multiplier/interpolator 50 has seven stages, stage 1 through 7 and operates similarly to the array multiplier disclosed in the aforementioned U.S. Pat. No. 4,209,844. The equations in Table I herein represent the operation of the digital filter wherein multiplier/interpolator 50 and filter adder 54 are utilized to solve these equations.

Figure 9A:
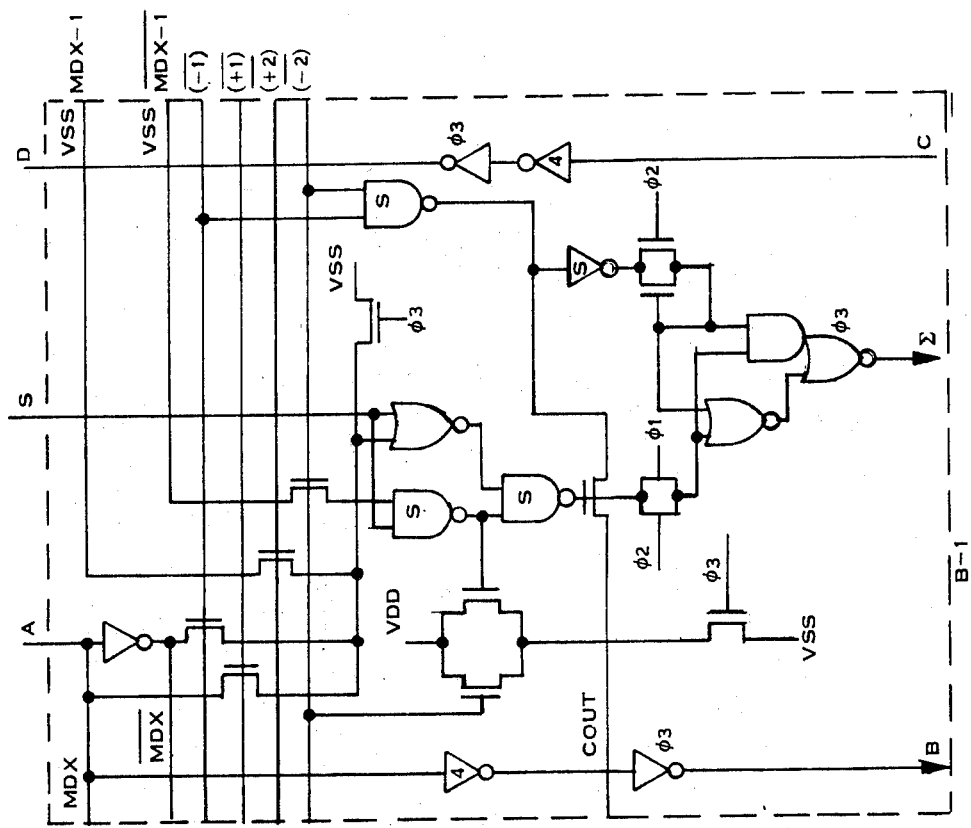
FIGS. 9aa, 9ab, 9ac, 9ba, 9bb, 9bc, 9ca, 9cb, 9cc, 9da and 9db are detailed logic diagrams of the blocks which form the array multiplier.
Figure 9A:
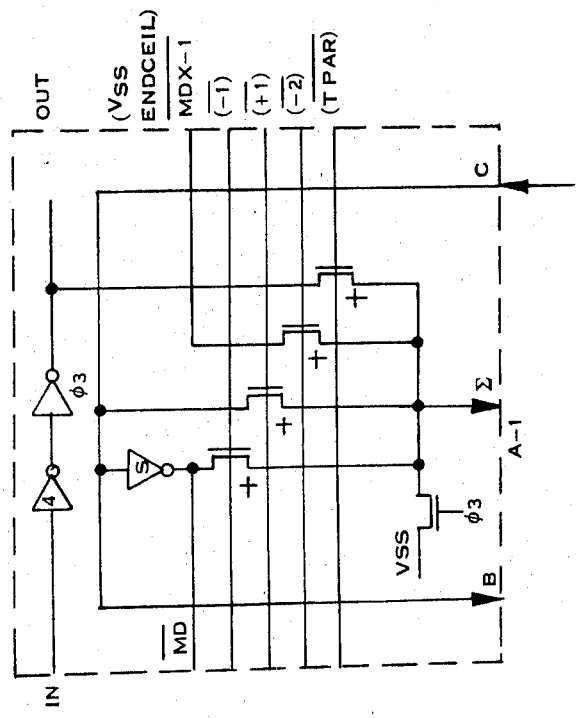
Figures 9A, 9B:
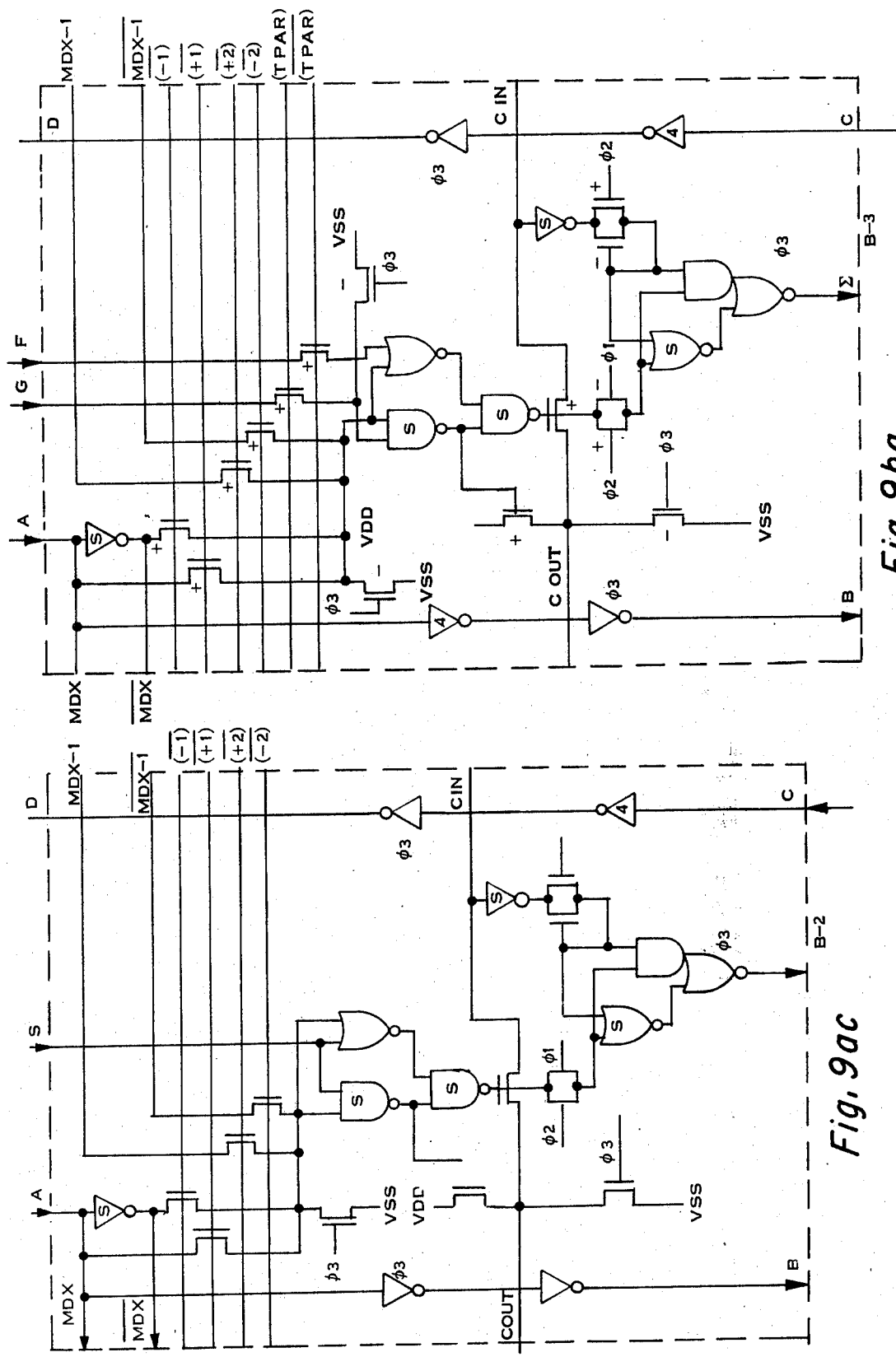
Figure 9B:
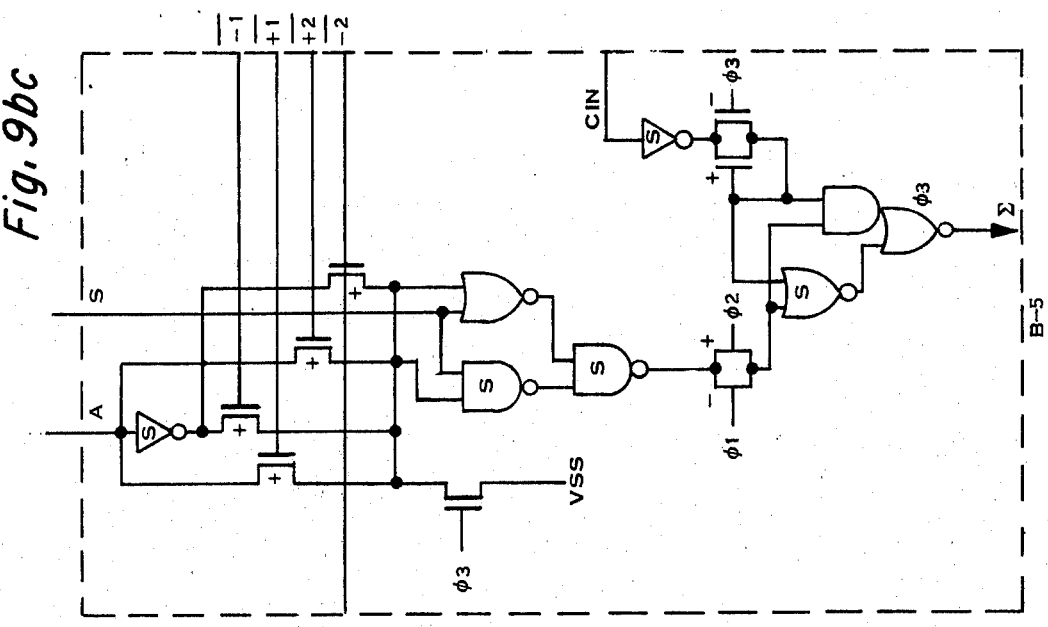
Figure 9B:
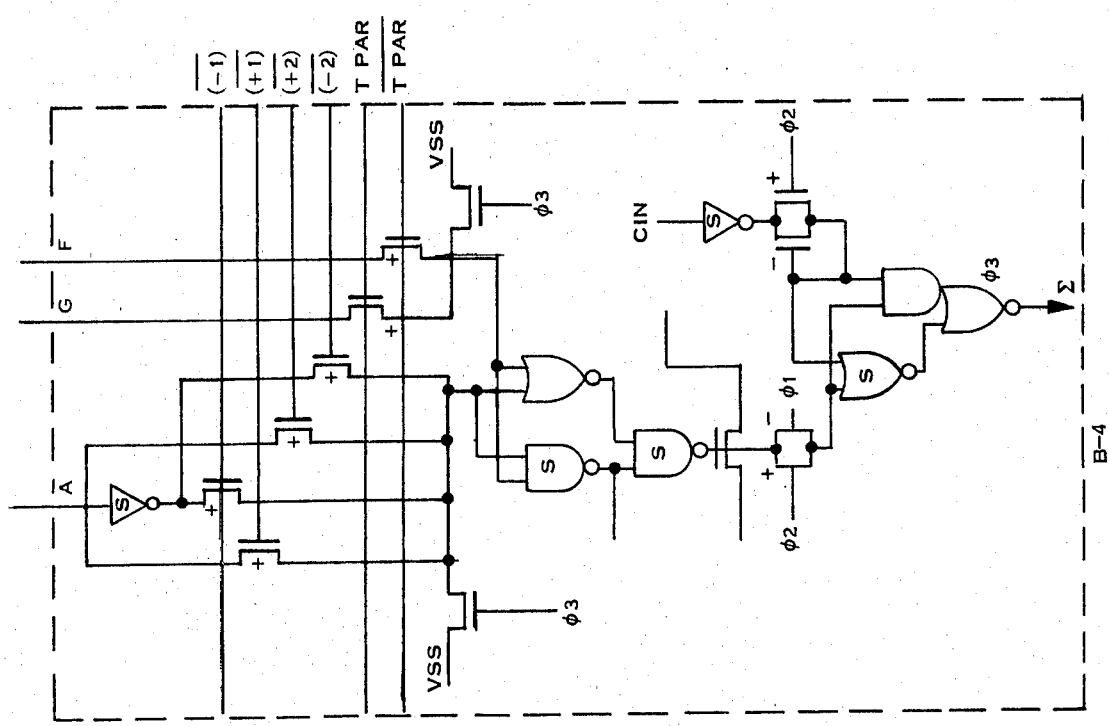
Figure 9C:
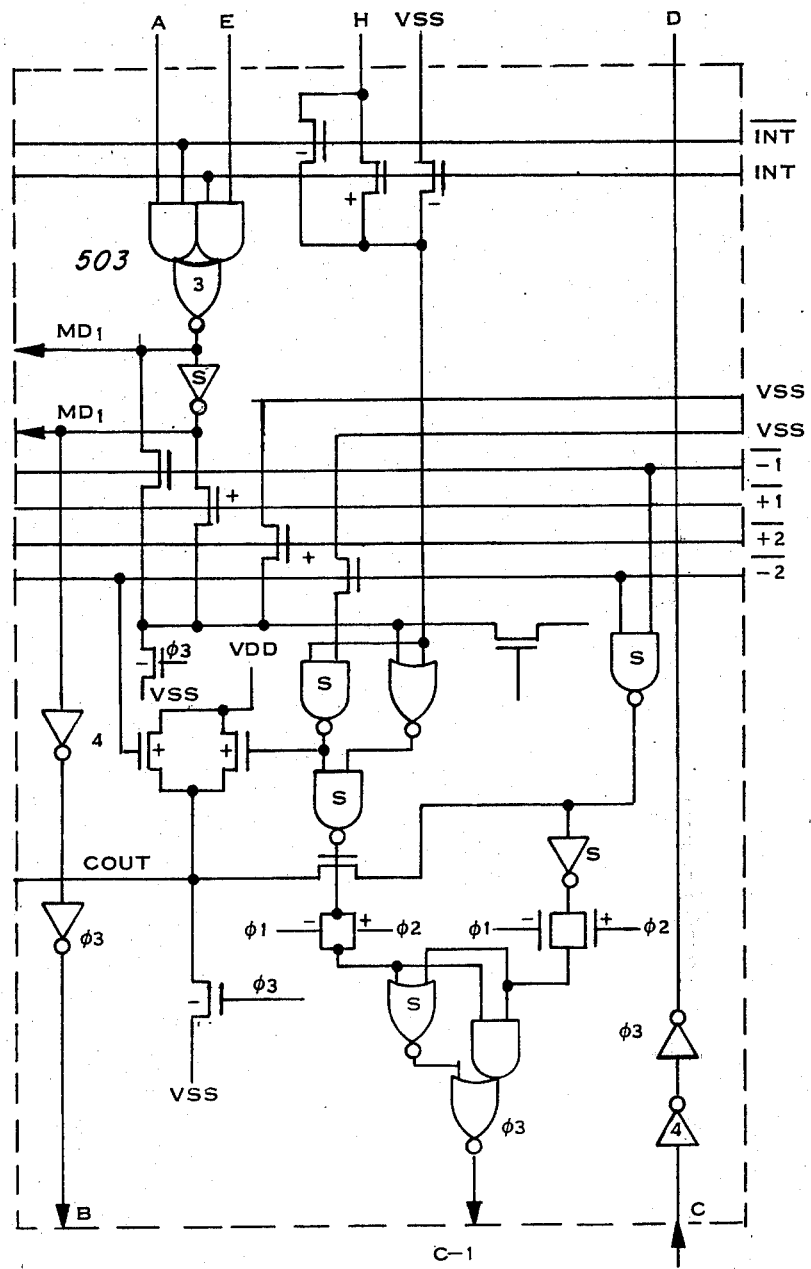
Figure 9C:
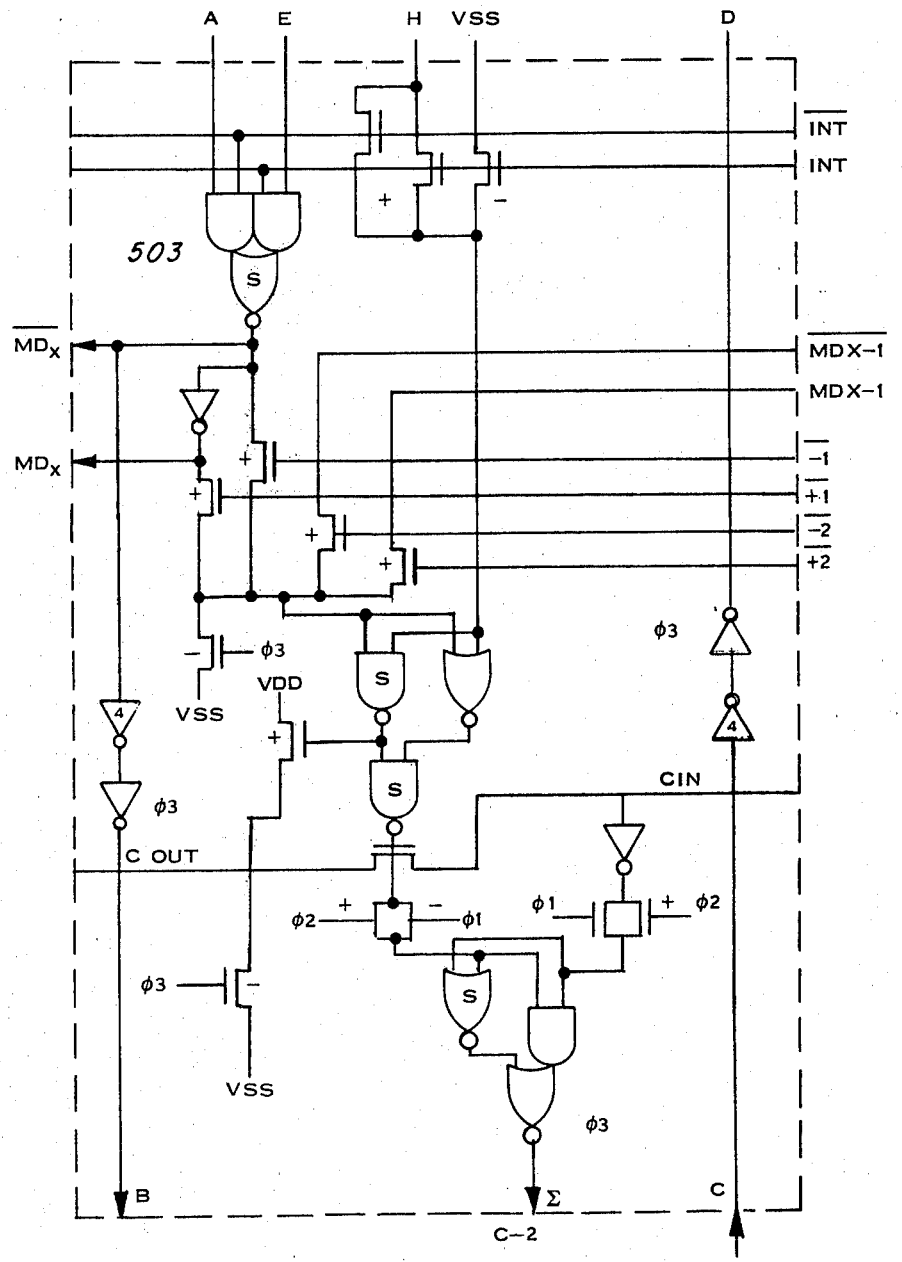
Figure 9C:
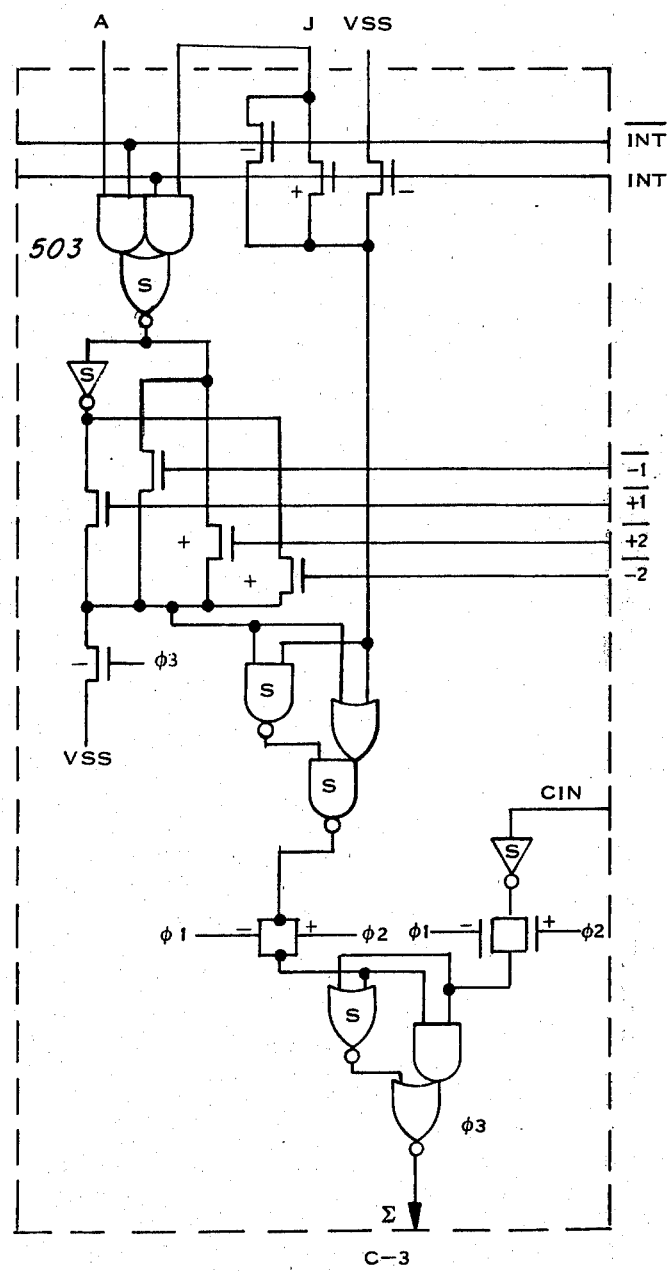

The inputs to multiplier/interpolator 50 are the target values for new parameters, input at the PROMOUT terminal of the first stage, the aforementioned $+1$, $-1$, $+2$ and $-2$ signals from recoding logic 52, and the INT and TPAR signal from recoding logic 52. The outputs of multiplier/interpolator 50, MULT 0–MULT13 and $\overline{PITCH\ 0}$–$\overline{PITCH\ 9}$ are applied to filter adder 54. The blocks which make up individual sections of each stage are labelled A-1, B-1 through B-5, C-1 through C-3 and D-1 and D-2. The detailed logic diagrams of each block section are shown in FIGS. 9aa–9db. The operation of multiplier/interpolator 50 is identical to that of the multiplier in U.S. Pat. No. 4,209,836, with the exception of additional interpolation circuitry which will be explained with reference to FIGS. 8a and 8b and also 9aa–9db.

The first stage of multiplier/interpolator 50 is comprised of nine A-1 blocks, with an additional bit of storage in the two inverters on its input and is thus responsive to the TPAR signal and to $-1$, $+1$, $-2$ signals output from recoding logic 52. When multiplications occurs in multiplier interpolator 50, the most significant bit is always maintained in the left most column elements while the partial sums are continuously shifted toward the right. Inasmuch as each stage of the multiplier/interpolator 50 operates on two binary bits, the partial sums, labelled E are each shifted to the right two places. Thus, a total capacity of ten bits is available. As explained earlier, whether coded or direct parameters are utilized, the parameters utilized in multiplier/interpolator 50 are ten bits in length, due to the decoding of any coded values by address PLA 36 and ROM 40. The ten bit parameters which are loaded into multiplier/interpolator 50 represent the target values for current calculations. As the interpolation calculations reach these target values, the target values become current values, and new target valves are loaded into multiplier/interpolator 50 at the PROMOUT point.

Current values for filter parameters are stored within multiplier/interpolator 50 in recirculating shift registers contained in all but the most significant bit of each stage. The recirculating shift registers circulate out of B terminals of each block and into the A terminals of the block below. At the bottom or seventh stage, the values are circulated back up through the D terminals into the C terminals. The current values shifted into the A terminals of each block are the multiplicands. The multipliers are the values input to multiplier/interpolator 50 by recoding logic 52.

The recirculating shift registers within multiplier/interpolator 50 form an eleven bit shift register, with each parameter shifting by each eleven time periods. There are twenty-two time periods, and each parameter K1–K9 is utilized twice during filter calculations. Thus eighteen time periods are required for these nine parameters. The K10 value and the energy value, as disclosed in U.S. Pat. No. 4,209,836, are each utilized once in filter calculations, and are therefore swapped or exchanged, in the seventh stage of multiplier/interpolator 50. This requires two additional time periods. Of the two remaining time periods, one is utilized during interpolation, and the other is not utilized.

In FIG. 9da and 9db, there is shown a detailed logic diagram of blocks D2 and D1. In each of the D type blocks, there is shown a group of gates labelled 501. The leftmost, latch 501a is a recirculating latch wherein either K10 or the energy value is stored. The multiplex gate 501b, in gates 501, is controlled by the signals labelled P' and E' which determine whether the signal outputted at the D terminal is the input from terminal A, or the contents of latch 501a. When the input signal at terminal A is the K10 parameter, it is stored in latch 501a and the previous contents of latch 501a are output through multiplex gate 501b. The output of multiplex gate 501b is coupled to terminal D through a transmission gate controlled by the signal labelled F.

INTERPOLATION

As discussed above, multiplier/interpolator 50 contains a recirculating shift register formed by vertical contacts between stages. The energy and K1–K10 parameters, which represent the current values, are recirculating through this register, occupying twenty of the possible twenty-two time periods. In order to perform interpolation, the current value of any given parameter must be captured and presented in the stage of multiplier/interpolator 50 to determine the difference between that current value and the target value being input at the appropriate time. Interpolation must take place when each target value is inputted, and not necessarily when the current value has circulated up to the proper position. The new current value (Vn+1) represents the sum of the old current value (Vn) plus some scale factor (N) times the difference between the old current value (Vn) and the target value (V$_T$). N, the scale value is some fractional number stored in ROM 78 and utilized during variable interpolation. Thus the interpolation formula may be expressed:

$$V_{n+1} = V_n + N(V_T - V_n) \qquad (1)$$

The sample of any given current value must therefore be stored until the unused time period which is utilized for interpolation. Each block in the seventh stage of multiplier/interpolator 50 has a storage latch 502, wherein the current value is temporarily stored. When a parameter to be interpolated circulates into the seventh stage D block, it passes through multiplex gate 501b and out through the D terminal. The value is also sampled through the transmission gate controlled by the signal N, and placed in storage latch 502. Storage latch 502 has a two input NOR gate on its recirculation line, the other input of which is the ZPAR signal utilized to zero parameters in specific states discussed above. Thus, the current value of the parameter to be interpolated is temporarily stored in storage latch 502. At the appropriate time period (T7 in the embodiment disclosed) the control signal labelled G is generated, and the contents of storage latch 502 are output to the D terminal. Therefore, the recirculating shift registers in multiplier/interpolator 50 contain the parameters K1–K9, an exchanged value representing K10 or Energy, and the about to be interpolated value of one of the parameters. The value to be interpolated is shifted up to the second stage of multiplier/interpolator 50 and, at the same time, the target value for that particular parameter is serially shifted into the first stage. Recoding logic 52 provides a $-1$ signal to the second stage, which operates on the value to be interpolated, the result of which is then added to the target value, which generates V$_T$−V$_n$, for output at the $\Sigma$ output terminal.

The third through sixth stage of multiplier/interpolator 50 act as an eight by ten bit multiplier during the interpolation time period for multiplying the difference between the target value and the current value (V$_T$−V$_n$) times the scale value N. The various values for N are stored in ROM 78 and inputted to mulltiplier/interpolator 50 through recoding logic 52, from multiplexer 58 and shift register 66 (as shown in FIG. 2b).

The third stage of multiplier/interpolator 50 is different from other stages due to the fact that the sum out of the second stage during interpolation is not merely added to the next calculation. In the interpolation operation, it is required that V$_T$−V$_n$ be utilized as the multiplicand in order to be multiplied be scale factor N. Thus, the V$_T$−T$_N$ value must be substituted for the multiplicands which are normally inputted on the A terminal from the B terminal above, in the normal recirculating shift register operation described above. In order to accomplish this exchange, each of the C blocks of multiplier/interpolator 50, shown in FIGS. 9ca, 9cb and 9cc, has a multiplex gate 503, controlled by the signal INT, which operates during the interpolation mode. When a $V_T=V_n$ value is present in the second stage of multiplier/interpolator 50, the INT signal controls gates 503 so that the signal at the E input terminal is selected by gate 503 and $V_T-V_n$ is inserted into the recirculating shift register to be utilized as the multiplicand. The $V_T-V_n$ value is inserted during one of the two unused time periods discussed above and therefore has no effect on the recirculating current parameter values. Since during interpolation, the third stage of multiplier/interpolator 50 is utilized as the first stage of an eight by ten bit multiplier, as discussed above, the input on the H terminal must be forced to zero. This is also accomplished by the INT signal coupling Vss into each C block at the H terminal.

The $V_T-V_n$ value is thus forced into the multiplicand position, and multiplied by the scale value N. Therefore the output of the sixth multiplier stage is the value $N(V_T-V_n)$. The seventh stage of multiplier/interpolator 50 is utilized to add the current value of a parameter to the recently calculated $N(V_T-V_n)$ value. As shown in the detail of the D blocks in FIGS. 9da and 9db, at time T18, the normal S input terminal is disabled and the E input is enabled through the bank of transmission gates depicted. T18 also enables a transmission gate which allows the contents of storage latch 502 to be coupled to full adder 504. Thus the output of full adder 504 is the solution to Equation (1) or $V_n+N(V_T-V_n)$. The output of full adder 504 is coupled through a transmission gate controlled by the signal labelled I and coupled into storage latch 502. This is necessary since the newly interpolated value is always available at T19, due to the requirement that all interpolation calculations take place during the aforementioned window or open spot which occurs in the recirculating shift register. At the appropriate time, the contents of storage latch 502 are forced back into the recirculating shift register through a transmission gate controlled by the signal labelled G. A special case occurs at the last interpolation prior to achieving the target value, or as described earlier herein, the IC=0 state. To avoid the problems generated by slight errors which may cause the interpolated value to be slightly over or under the target value, a special case is utilized for the last interpolation or interpolation count equal to zero state (IC=0). As in normal interpolation, the current value of a particular parameter is captured and inserted into the interpolation time period in the recirculating shift register. However, rather than being operated upon by the $-1$ signal from recoding logic 52, the current value is zeroed and then subtracted from the target value. The target value is then circulated down to the seventh stage of multiplier/interpolator 50 where it is input on the A terminal. The signal is then shifted through multiplex gate 501b in each block of the seventh stage, and inserted into storage latch 502 directly by way of a transmission gate controlled by a signal labelled H. Thus, rather than a newly interpolated value, during the last interpolation the target value itself is inserted into storage latch 502. Again as above, at the appropriate time the contents of storage latch 502 are inserted into the recirculating shift register to replace the old current value. This process is repeated, and a new parameter is interpolated.

A slightly different operation is utilized for interpolation of the pitch value. After a target value for pitch is input to multiplier/interpolator 50, it is circulated down through the recirculating shift register discussed above. Entering the seventh stage at the A terminal, it is passed through multiplex gate 501b and stored in storage latch 502. If the value in storage latch 502 is a pitch value, it is stored in pitch latch 505. Each block of the seventh stage of multiplier/interpolator 50 has a latch 505 for storing one bit of the pitch value. The pitch latch 505 is controlled by the signals labelled M and N in FIG. 9db. Pitch latch 505 then stores the pitch value until the appropriate time, when the control signal labelled L allows the pitch value to be outputted.

The outputs of multiplier/interpolator 50 include PITCH 0-PITCH 9, representative of the pitch value stored in the pitch latch formed by gates 505, and MULT 0-MULT 13, which represent the intermediate products generated during filter operation. As shown in FIG. 8b, the least significant bit of the MULT output (MULT 0) is forced to the value of the sign bit (MULTSN). This transaction is utilized to prevent the negative drift which normally results from simple truncation of a two's complement number. By forcing the least significant bit to the value of the sign bit, truncation is always toward zero. Those skilled in the art will appreciate that this truncation scheme will help avoid the "limit cycle" problem.

FILTER ADDER

Figure 11A:
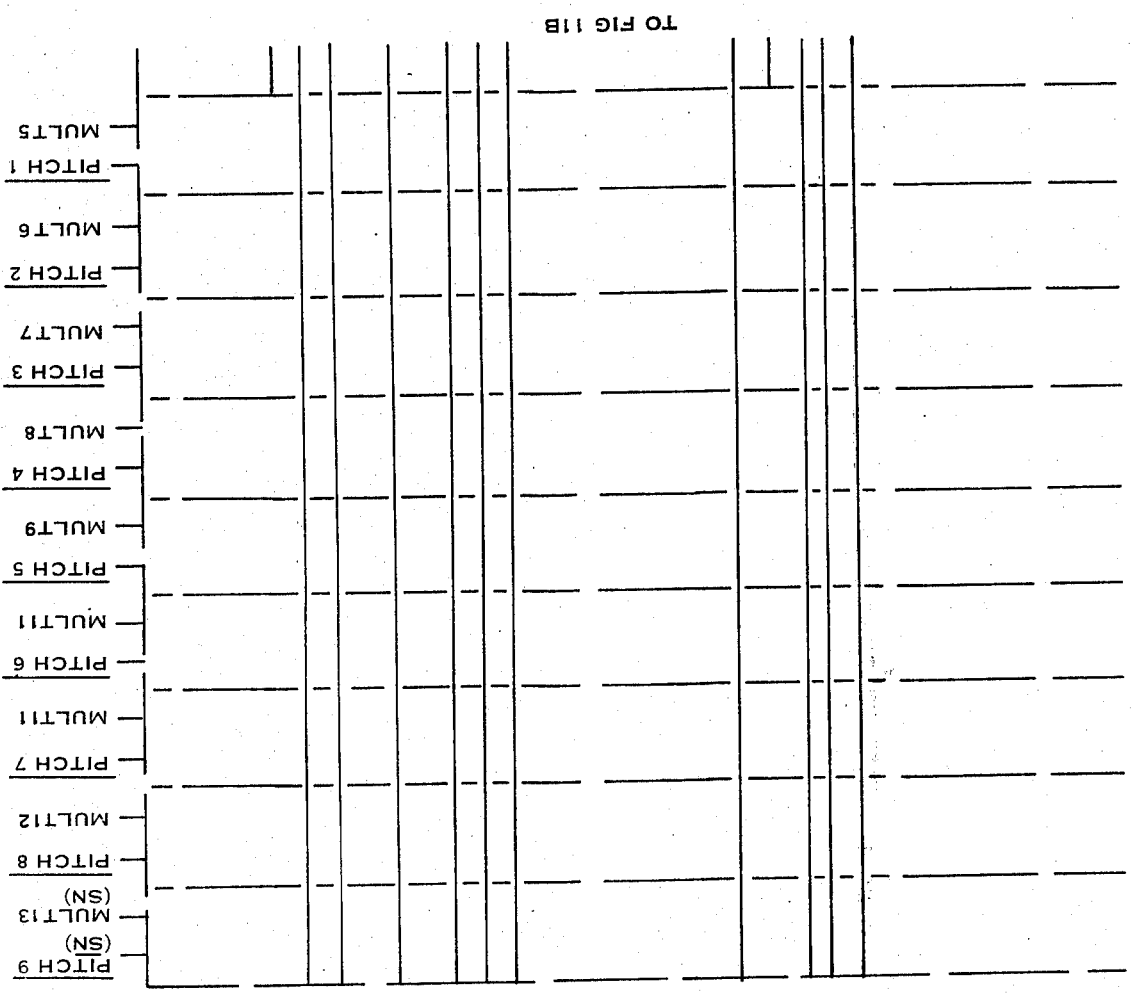
FIGS. 11a and 11b are detailed logic diagrams of the filter adder.
Figure 11B:
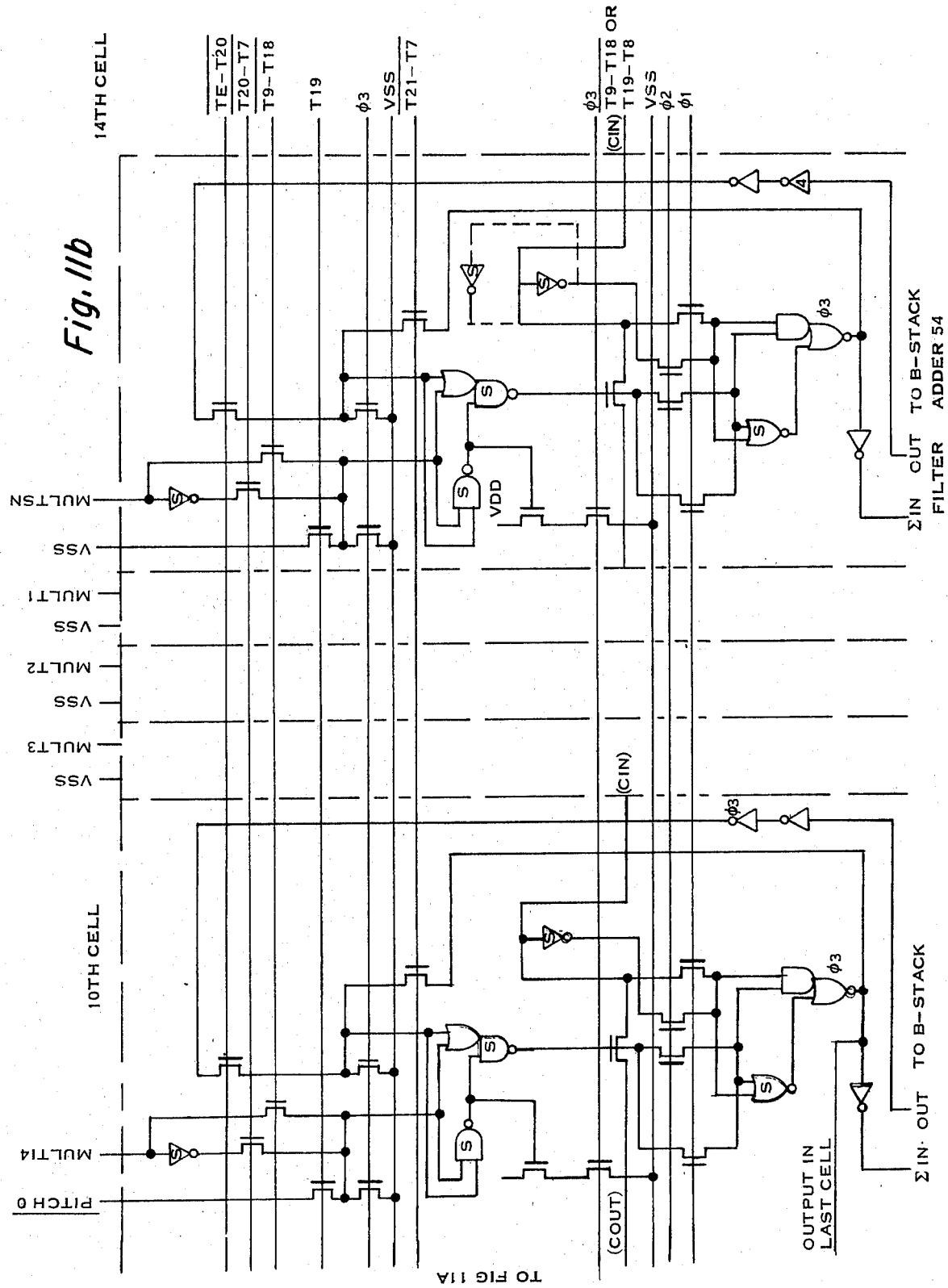
Figure 12A:
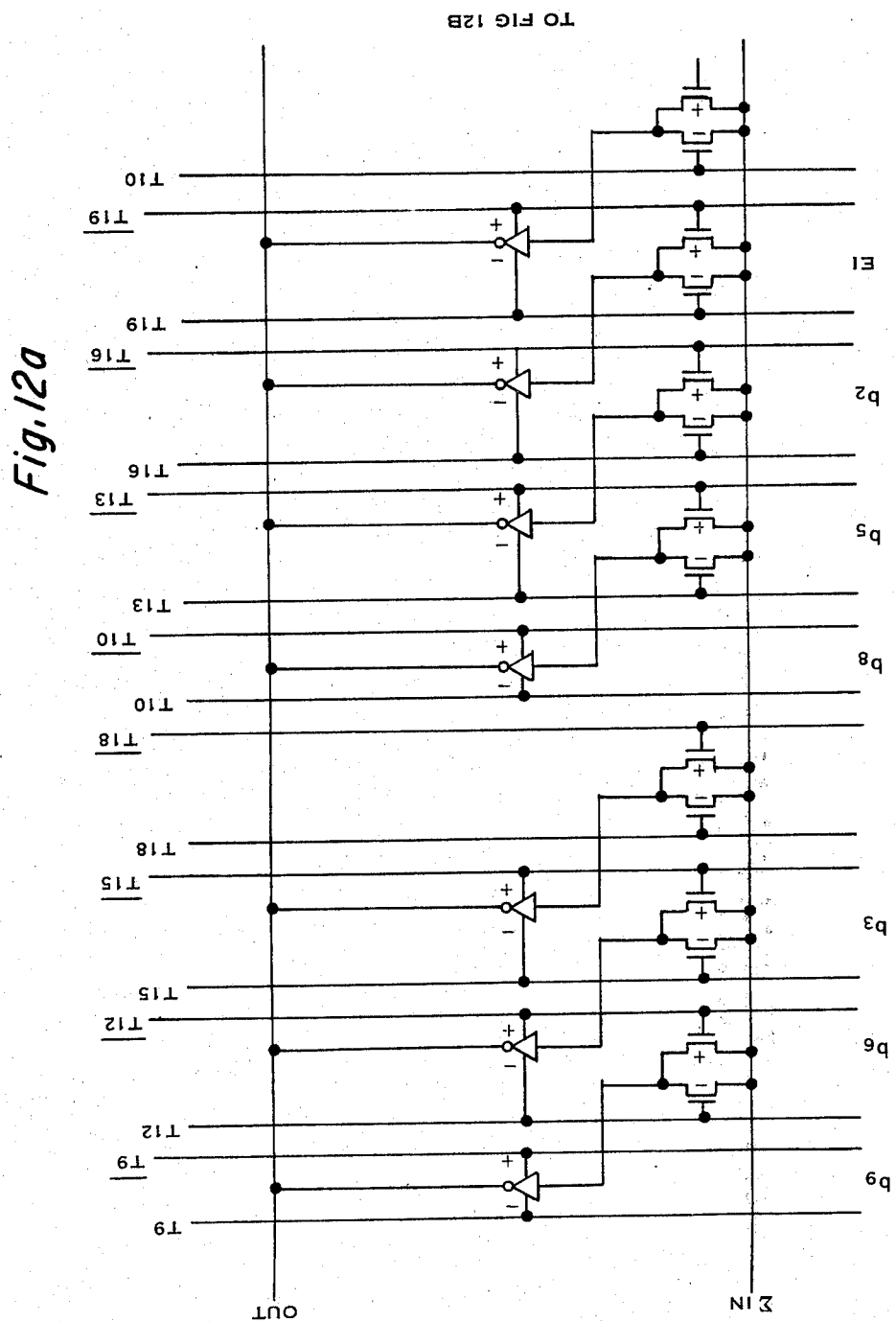
FIGS. 12a and 12b are detailed logic diagrams of one cell of the B-Stack, PPC, Y Latch register.
Figure 12B:
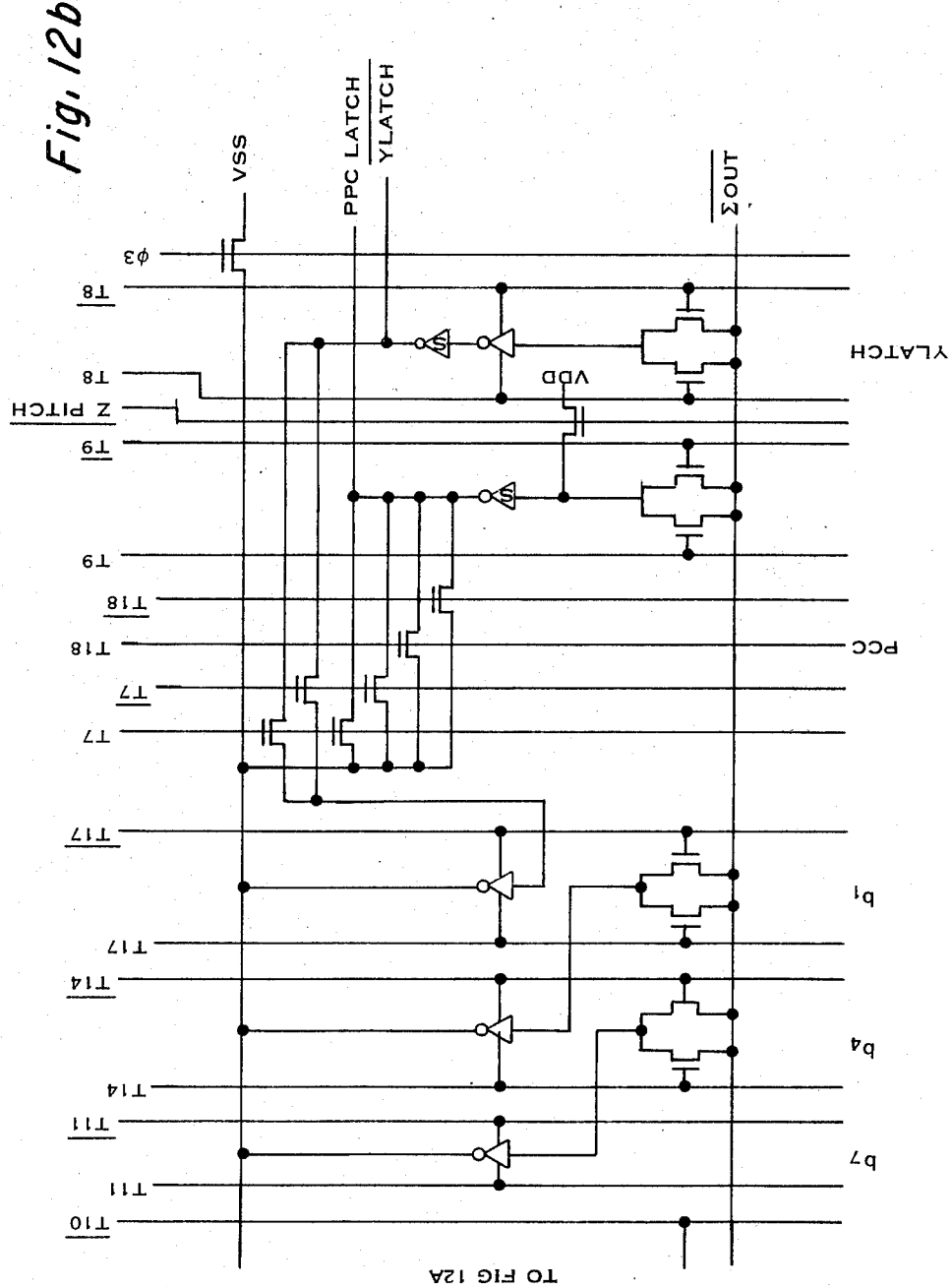

Filter adder 54 is shown in FIGS. 11a and 11b. The tenth and fourteenth block of filter adder 54 are shown in detail. Filter adder 54 is utilized to perform the additions and subtractions necessary to solve the equations listed in Table I. There are twenty additions or subtractions required to implement a ten pole filter, utilizing twenty of the twenty-two time periods. During the free time periods, filter adder 54 increments a pitch period counter signal and compares it to the pitch value inputted from multiplier/interpolator 50. The pitch period counter (PPC) is utilized to address periodic or voiced excitation values in ROM 78. When the PPC signal is equal to the pitch value, it is zeroed and begins incrementing again. A more detailed description of the PPC signal operation is listed below.

B STACK

B stack 56 is a temporary storage facility utilized to temporarily store those intermediate values or "b" values which are necessary to solve the equations listed in Table I. B stack 56 is shown in detail in FIGS. 12a and 12b. B stack 56 also provides temporary storage for the aforementioned PPC signal and the YLATCH signal which represents the output of the filter formed by multiplier/interpolator 50 and filter adder 54. The YLATCH output is coupled to the digital to analog converter and is utilized to generate analog signals representative of a human voice. The PPC signal is output to multipurpose shift register 66 where it is utilized to address excitation values.

FILTER INTERCONNECTS

Figure 13B:
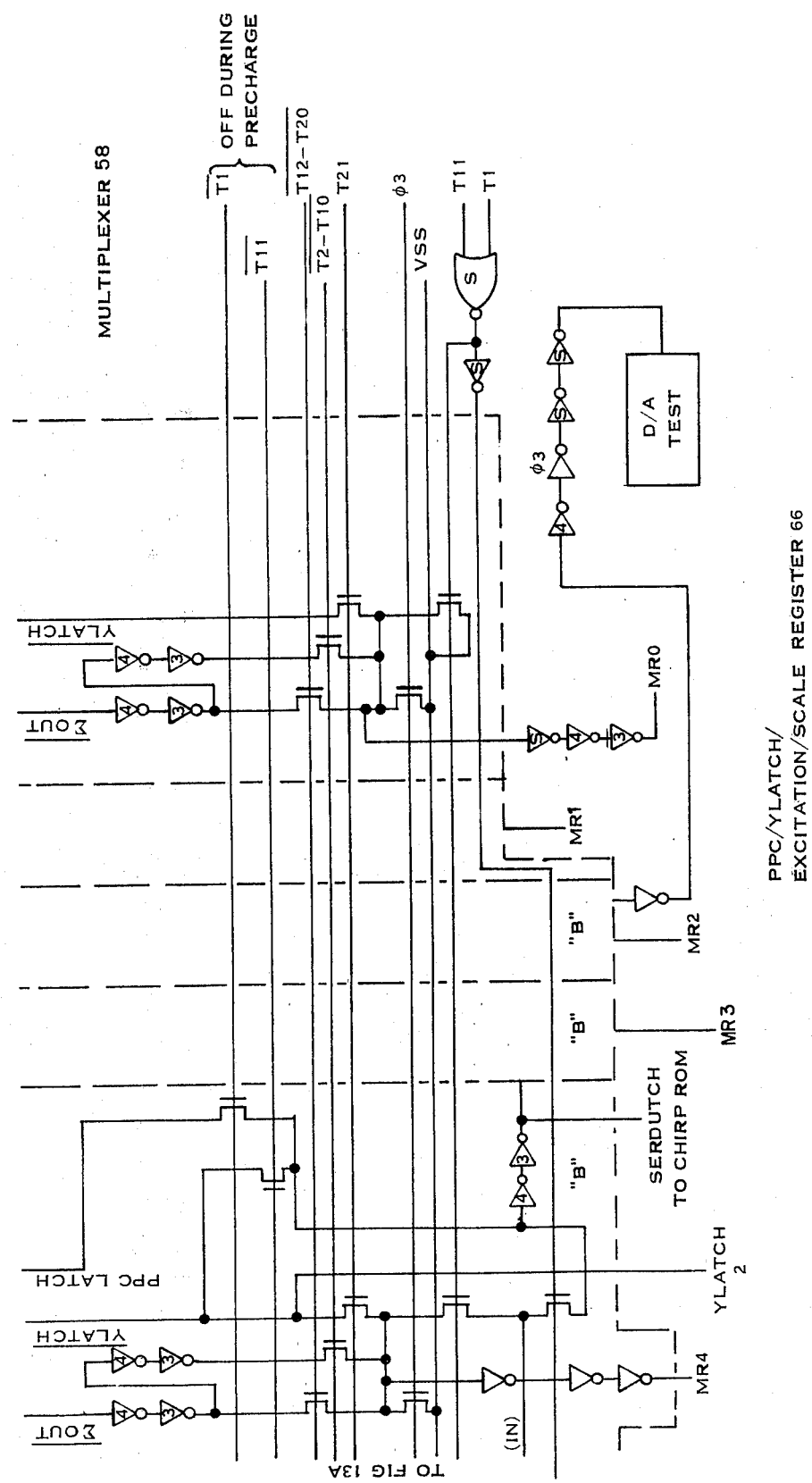

The multipurpose shift register 66 and multiplexer 58 are shown in FIGS. 13a and 13b, and two of the stages are shown in detail therein. Reference to the block diagram of FIG. 2b and the equations of Table I will facilitate an understanding of the interworkings of the filter output circuitry. The MULT outputs from multiplier/interpolator 50 represent intermediate products required to solve the equations of Table I. Such products may be a K value times a b value, or a K value times a Y value. Filter adder 54 then adds or subtracts the intermediate product from a Y value or a b value to obtain a Y value or a b value. B stack 56 is utilized to store these b values, since each b value is utilized in filter adder 54 to calculate the next b value. The PPC signal from B stack 56 is input to shift register 66 and output to multiplexer 70. Multiplexer 70, not shown in detail, utilizes the PPC signal to address voiced excitation values stored in ROM 78. Any conventional address scheme may be utilized. The values stored in ROM 78 represent a chirp function, as in U.S. Pat. No. 4,209,836, as it has been found that a chirp function closely models vocal cord excitation. Multipurpose shift register 66 also receives the aforementioned excitation values, or scale values addressed by an interpolation count signal from ROM 78 which are multiplexed out as MR signals to recoding logic 52.

The scale values stored in ROM 78 are chosen by the operator to generate any desired type of interpolation. As previously discussed, the IC or interpolation count may be any number from one to one hundred twenty seven. The IC count is utilized to address scale factors in ROM 78. Thus, in the embodiment disclosed, up to one hundred twenty seven custom scaling values may be stored in ROM 78. A mask programmable option, or programmable type memory will allow easy substitution of scale values or excitation values. Scale values are typically fractional values utilized during interpolation of speech data and may be linearly or nonlinearly related.

Another important feature of the excitation signals provided by ROM 78 concerns the capability of scaling unvoiced excitation. In previous speech synthesis systems, such as disclosed in U.S. Pat. No. 4,209,836, the unvoiced excitation is characterized as white noise. Such an input may be generated in many ways, such as a constant value with a pseudorandom sign bit. This solution is quite adequate; however, the inability to scale the unvoiced excitation to the voiced excitation results in unbalanced excitation signals. ROM 78, in the embodiment disclosed, also stores two unvoiced excitation signals, of approximately equal value, and opposite sign. A random bit is generated by unvoiced address generator 76 and is utilized as one bit in the address of the two aforementioned unvoiced excitation signals. This allows great resolution of the level of the unvoiced excitation, and further, allows the operator to change the level or value to balance excitation signals. Although ROM 78 is disclosed in the present embodiment as a Read Only Memory, those skilled in the art will appreciate that a Random Access Memory will provide an easier method of value changing than the mask programmable method required by a Read Only Memory.

An alternate form of excitation is also available through tristate buffer 68, shown in FIG. 2b. This gate allows synthesizer 10 to be utilized as a residually excited synthesizer, in a vocoder application for example.

Multiplexer 58 is utilized to couple the newly calculated "b" values or Y values to recoding logic 52. Multiplexer 58 may also couple excitation values or scale values to recoding logic 52, the former for filter calculations, and the latter for interpolations. The outputs of multiplexer 58 are labelled MR0–MR12 and MRSN (for sign bit).

DIGITAL TO ANALOG CONVERTER

The digital-to-analog converter herein described is particularly well suited to low voltage applications and may be implemented in complementary MIS, such as CMOS, and may be integrated on a common semiconductor substrate with the CMOS synthesizer described above.

Digital-to-Analog converter 64 receives the YLATCH output signal from B stack 56 in a nine bit, two's complement notation, and converts the YLATCH signal into an analog signal representative of human speech. A detailed illustration of Digital-to-Analog converter 64 is seen in FIGS. 14a–14c.

Figure 14A:
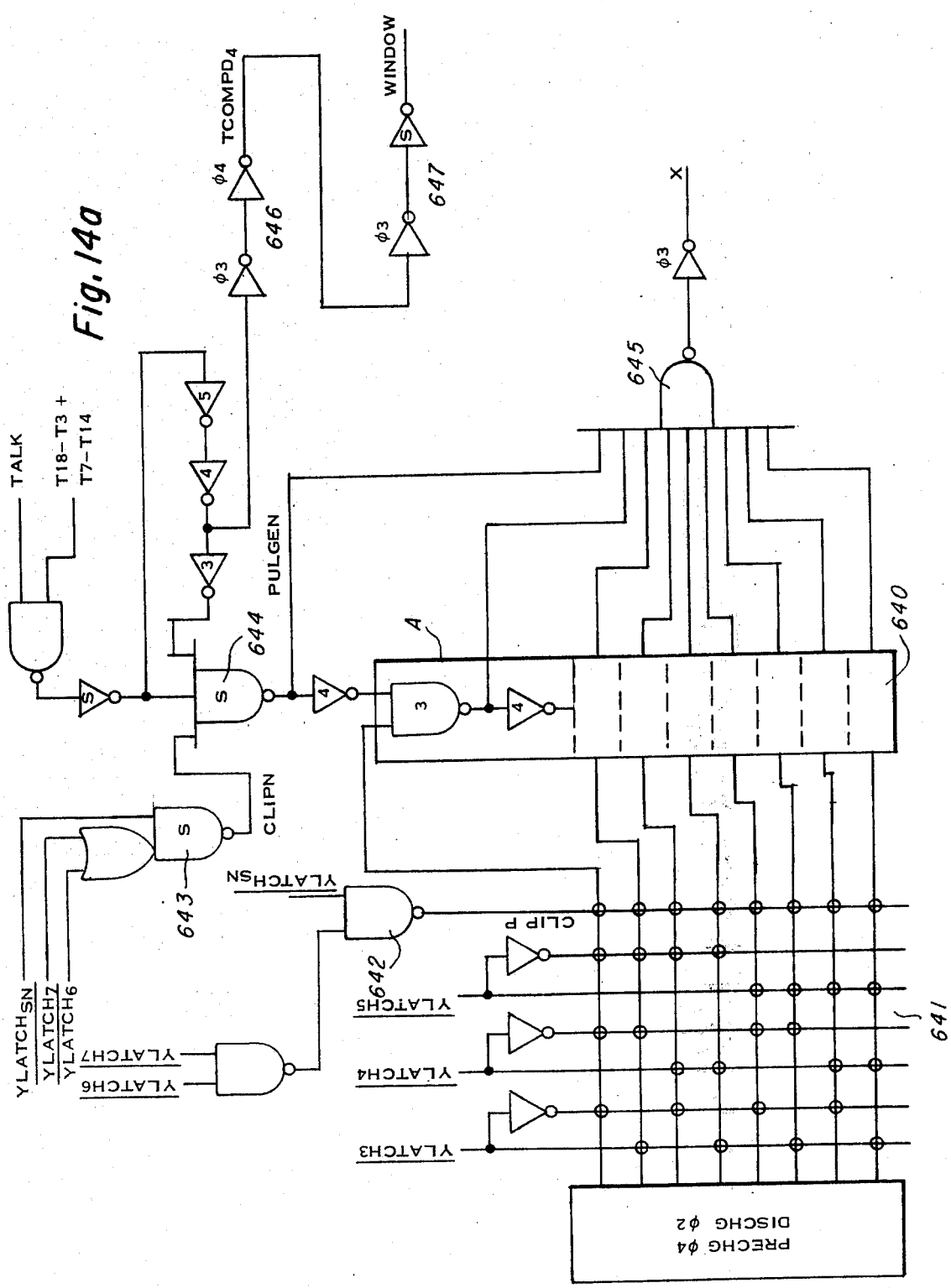
FIGS. 14a–14c are detailed logic diagrams of the digital-to-analog and output circuitry.

In FIG. 14a, there is shown a PLA 641 with inputs YLATCH3, YLATCH4 and YLATCH5. Another input is the signal CLIPP from gate 642. Gate 642 and Gate 643 form a clipping circuit. A nine bit two's complement signal has a range from −256 to +255. It has been demonstrated that the larger values of a speech waveform convey little intelligence and may be clipped without loss of essential intelligence. Gates 642 and 643 examine the two most significant bits of the YLATCH signal ($\overline{YLATCH\ 6}$ and YLATCH7) and the sign bit YLATCHSN to determine if the absolute value of the incoming value exceeds 64, a CLIPP or CLIPN signal is generated.

Shift register 640 is a controllable register triggered off gate 644. Gate 644 generates a leading edge of the time periods T18 through T3 or T7 through T14, when synthesizer 10 is generating speech. Gate 644 may be disabled by the CLIPN signal, thus preventing a pulse from shifting into register 640. Assuming a large negative value is not present, the leading edge propagates down register 640, to an extent controlled by PLA 641. The YLATCH values input to PLA 641 will determine how far down register 640 the pulse propagates. It should be noted that in the event of a large positive value, CLIPP will cause the pulse to propagate to the end of register 640. The output gate 644 is coupled directly to gate 645, as are the complemented outputs of the eight stages of register 640. Therefore, if gate 644 is enabled, gate 645 will act as an OR function, and at point X there will be generated a variable width pulse, ranging from one to eight time periods in length. Additionally, the composite signal comprised of TALK, and T18 through T3 or T7 through T14 is delayed by gates 646 to form TCOMPD4, a delayed signal. The TCOMPD4 signal is further delayed to form a signal called WINDOW. Gates 647 are shown providing the additional half bit of delay; however, for additional accuracy, the WINDOW signal may be finely adjusted utilizing high speed clock signals. The WINDOW signal is required to remove the PULGEN, minimum pulse width, when all inputs are zero. The PULGEN signal is required to charge the logics in the programmable delay shown in FIGS. 14b and 14c.

Figure 14B:
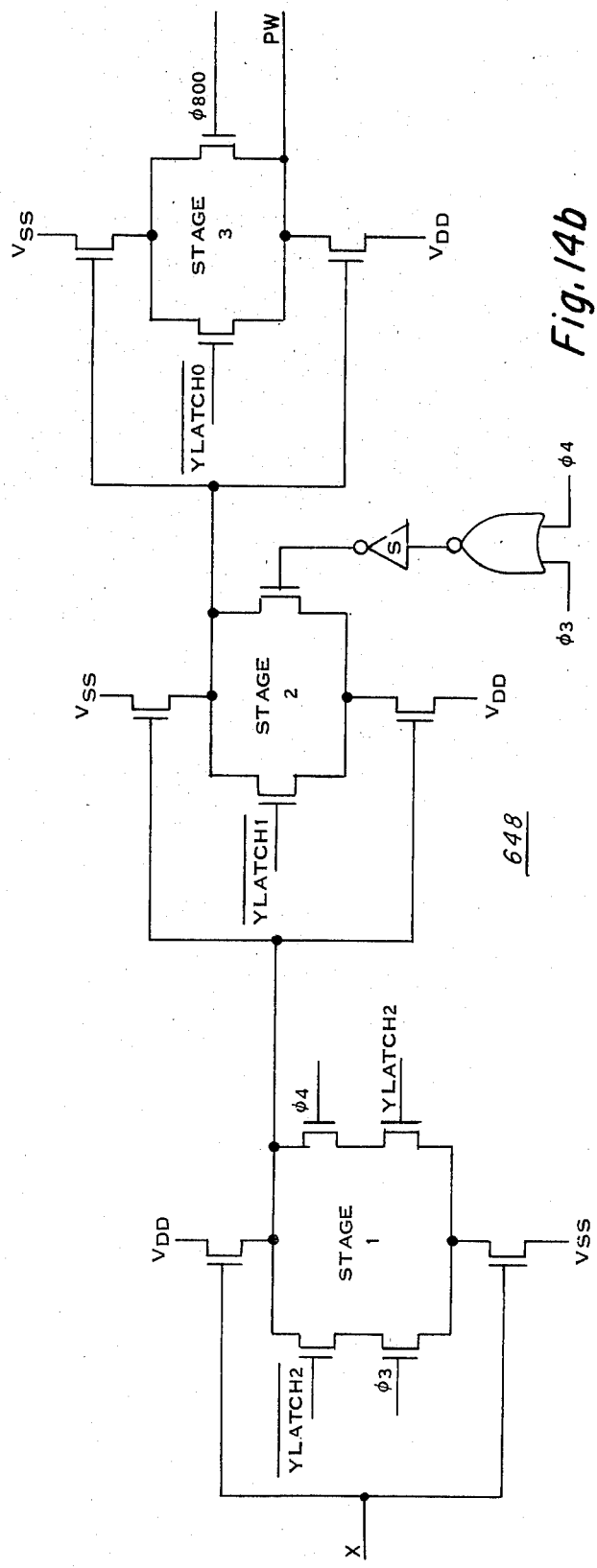
Figure 14C:
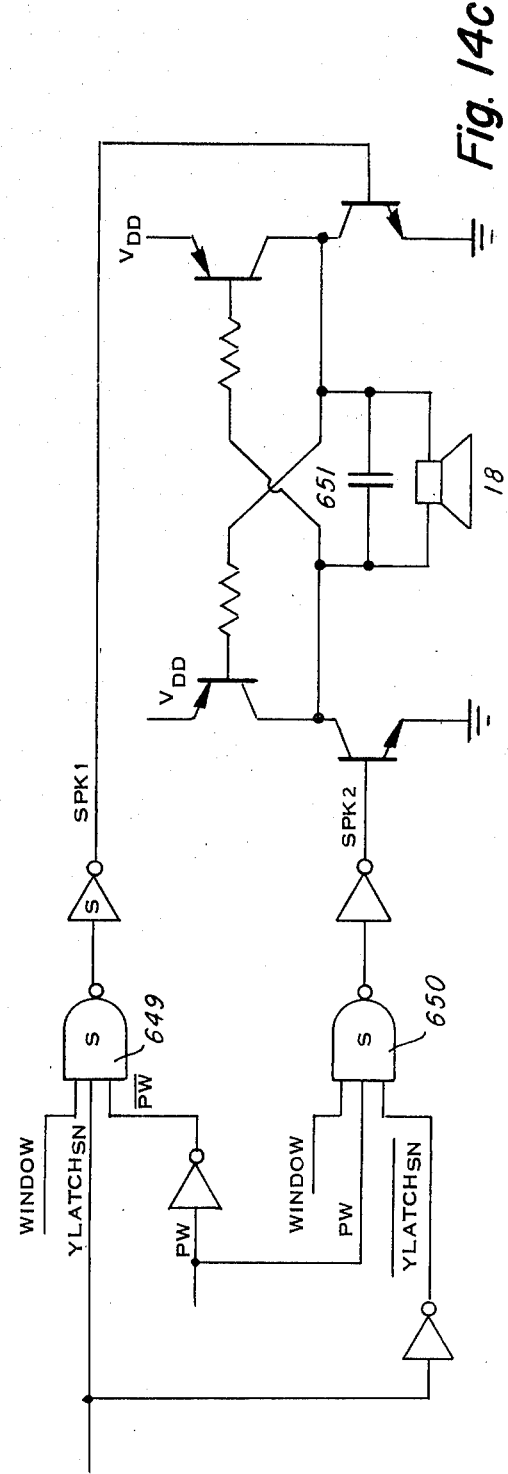

In FIG. 14b there are shown detailed logic diagrams of a three stage programmable delay 648 and the output speaker drive circuitry. The programmable delay shown in FIG. 14b has three stages. Each stage has a positive or P type device and a negative or N type device above and below it. A zero at point X will turn on the P device in stage 1, the N device in stage two and the P device in stage 3, causing PW to be a logic one or VDD. Thus a positive pulse out of gate 645 (FIG. 14a) will be propagated through programmable delay 648 statically. When the pulse ends, or X goes to a logic one, the P device in stage one shuts off and the N device conducts. Following this, the output of stage one will go to Vss, or logic zero, conditionally, based upon the clock gates contained between the P device and N device. The clocked gates in stage one are thus capable of extending the pulsewidth seen at PW. Stage one is clocked to provide either one half of a time period of delay, or no additional delay. Similarly, stage two can provide either one fourth of a time period delay, or no additional delay. Stage three also operates similarly; however, a special high speed clock $\phi 800$ is utilized to provide a delay of one eighth of a time period. Thus, the output at PW is either zero, when large negative numbers cause gate 644 to be disabled, or a pulse from one to eight and seven/eighths time period in length, with one eighth time period resolution.

The PW signal is still expressed in two's complement notation, and must therefore be converted to sign magnitude data for negative numbers. In FIG. 14c, gates 649 and 650 are utilized to generate complementary sign magnitude, pulse width modulated signals. The positive numbers are generated by gate 650 (YLATCHSN equals zero) with PW and WINDOW, to eliminate the PULGEN pulses. PW is inverted to effectively convert negative numbers (YLATCHSN equals one) to sign magnitude data through gate 649.

The two pulsewidth modulated values SPK1 and SPK2 are then applied to a push/pull output circuit 651. Circuit 651 is utilized since it possesses no DC power component, and will effectively drive speaker 18.

ALTERNATIVE EMBODIMENTS

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

TABLE I

| EQUATION | STAGE |
|---|---|
| $Y_{10}(i) = Y_{11}(i) - K_{10}b_{10}(i - 1)$ | 10 |
| $Y_9(i) = Y_{10}(i) - K_9b_9(i - 1)$ | 9 |

TABLE I-continued

| EQUATION | STAGE |
|---|---|
| $b_{10}(i) = b_9(i - 1) + K_9Y_9(i)$ | 9 |
| $Y_8(i) = Y_9(i) - K_8b_8(i - 1)$ | 8 |
| $b_9(i) = b_8(i - 1) + K_8Y_8(i)$ | 8 |
| $Y_7(i) = Y_8(i) - K_7b_7(i - 1)$ | 7 |
| $b_8(i) = b_7(i - 1) + K_7Y_7(i)$ | 7 |
| $Y_6(i) = Y_7(i) - K_6b_6(i - 1)$ | 6 |
| $b_7(i) = b_6(i - 1) + K_6Y_6(i)$ | 6 |
| $Y_5(i) = Y_6(i) - K_5b_5(i - 1)$ | 5 |
| $b_6(i) = b_5(i - 1) + K_5Y_5(i)$ | 5 |
| $Y_4(i) = Y_5(i) - K_4b_4(i - 1)$ | 4 |
| $b_5(i) = b_4(i - 1) + K_4Y_4(i)$ | 4 |
| $Y_3(i) = Y_4(i) - K_3b_3(i - 1)$ | 3 |
| $b_4(i) = b_3(i - 1) + K_3Y_3(i)$ | 3 |
| $Y_2(i) = Y_3(i) - K_2b_2(i - 1)$ | 2 |
| $b_3(i) = b_2(i - 1) + K_2Y_2(i)$ | 2 |
| $Y_1(i) = Y_2(i) - K_1b_1(i - 1)$ | 1 |
| $b_2(i) = b_1(i - 1) + K_1Y_1(i)$ | 1 |
| $b_1(i) = Y_1(i)$ | |

What is claimed is:

1. A low voltage speech synthesis system comprising:
   memory means for storing a plurality of digital speech values including digital speech values representative of digital filter coefficients;
   complementary metal-insulator-semiconductor integrated circuit controller means for controlling the selective accessing of portions of said plurality of digital speech values including said digital speech values representative of digital filter coefficients from said memory means;
   complementary metal-insulator-semiconductor integrated circuit digital filter speech synthesizer means coupled to said memory means and responsive to said selectively accessed digital speech values for generating digital speech signals representative of human speech;
   complementary metal-insulator-semiconductor integrated circuit pulse width modulated digital-to-analog converter means coupled to said digital filter speech synthesizer means for converting said digital speech signals representative of human speech into analog signals; and
   audio means coupled to said digital-to-analog converter means for converting said analog signals into audible sound.

2. The speech synthesis system according to claim 1, wherein said digital filter speech synthesizer means and said digital-to-analog converter means are integrated on a single semiconductor substrate common thereto.

* * * * *